US012658629B2

(12) United States Patent
Kim et al.

(10) Patent No.: US 12,658,629 B2
(45) Date of Patent: Jun. 16, 2026

(54) CONNECTOR FOR HIGH-SPEED SIGNAL TRANSMISSION WITH RIGID ALIGNMENT FUNCTION

(71) Applicant: WITHWAVE, Suwon-si (KR)

(72) Inventors: Sung Jin Kim, Yongin-si (KR); Jeong Il Jeon, Seoul (KR); Maeng Youl Lee, Seoul (KR); Yong Goo Lee, Seongnam-si (KR); Jeong Nam Cheon, Seoul (KR); Young Kun Kwon, Hwaseong-si (KR); Bum Hee Bae, Yongin-si (KR); Youn Ho Kim, Seoul (KR); Jong Wan Shim, Seongnam-si (KR); Seong Soo Han, Seongnam-si (KR)

(73) Assignee: WITHWAVE, Suwon-si (KR)

( * ) Notice: Subject to any disclaimer, the term of this patent is extended or adjusted under 35 U.S.C. 154(b) by 693 days.

(21) Appl. No.: 17/974,413

(22) Filed: Oct. 26, 2022

(65) Prior Publication Data

US 2023/0223715 A1 Jul. 13, 2023

(30) Foreign Application Priority Data

Nov. 11, 2021 (KR) ........................ 10-2021-0154468

(51) Int. Cl.

| | |
|---|---|
| ***H01R 13/05*** | (2006.01) |
| ***H01R 12/71*** | (2011.01) |
| ***H01R 13/436*** | (2006.01) |
| ***H01R 13/514*** | (2006.01) |
| ***H01R 13/629*** | (2006.01) |

(52) U.S. Cl.

CPC ......... *H01R 13/436* (2013.01); *H01R 12/716* (2013.01); *H01R 13/05* (2013.01); *H01R 13/514* (2013.01); *H01R 13/629* (2013.01)

(58) Field of Classification Search

CPC ...... H01R 12/716; H01R 12/73; H01R 13/05; H01R 13/436; H01R 13/506; H01R 13/514; H01R 13/629

See application file for complete search history.

(56) References Cited

U.S. PATENT DOCUMENTS

| | | | | |
|---|---|---|---|---|
| 6,533,597 B1 * | 3/2003 | Wang | H05K 7/1007 | 439/70 |
| 6,860,741 B2 * | 3/2005 | Ashman | H05K 13/0465 | 439/70 |
| 6,869,292 B2 * | 3/2005 | Johnescu | H01R 12/716 | 439/74 |
| 7,429,176 B2 * | 9/2008 | Johnescu | H01R 12/716 | 439/74 |

(Continued)

FOREIGN PATENT DOCUMENTS

| | | |
|---|---|---|
| CN | 103545659 | 1/2014 |
| JP | 2003-132992 | 5/2003 |

(Continued)

*Primary Examiner* — Abdullah A Riyami
*Assistant Examiner* — Thang H Nguyen

(57) ABSTRACT

Proposed is a connector for high-speed signal transmission with a rigid alignment function. The connector allows rigid alignment between pin arrays as a part of the connector moves slightly in the left-right or front-rear direction depending on the degree of engagement between corresponding pins when coupled to a counterpart connector.

15 Claims, 19 Drawing Sheets

(56) References Cited

U.S. PATENT DOCUMENTS

| | | | | |
|---|---|---|---|---|
| 7,462,040 | B1 * | 12/2008 | Takada | H01R 13/193<br>439/76.1 |
| 8,231,409 | B2 * | 7/2012 | Lebrun | H01R 13/64<br>439/595 |
| 9,543,703 | B2 * | 1/2017 | Horchler | H01R 13/05 |
| 9,871,323 | B2 * | 1/2018 | Horchler | H01R 13/631 |
| 10,230,192 | B2 * | 3/2019 | Peloza | H01R 13/428 |
| 10,454,193 | B2 * | 10/2019 | Iwasaki | H01R 13/05 |
| 2019/0052003 | A1 * | 2/2019 | Hasegawa | H01R 12/91 |
| 2021/0257759 | A1 * | 8/2021 | Cheng | H01R 12/7082 |
| 2022/0013941 | A1 * | 1/2022 | Tanaka | H01R 13/631 |
| 2023/0178909 | A1 * | 6/2023 | Li | H01R 12/707<br>439/65 |

FOREIGN PATENT DOCUMENTS

| | | |
|---|---|---|
| JP | 2009-070565 | 4/2009 |
| JP | 2017-126512 | 7/2017 |
| JP | 2017-147111 | 8/2017 |
| KR | 10-2031505 | 10/2019 |
| KR | 10-2020-0130144 | 11/2020 |

* cited by examiner

CONNECTOR FOR HIGH-SPEED SIGNAL TRANSMISSION WITH RIGID ALIGNMENT FUNCTION

CROSS REFERENCE TO RELATED APPLICATION

The present application claims priority to Korean Patent Application No. 10-2021-0154468, filed Nov. 11, 2021, the entire contents of which is incorporated herein for all purposes by this reference.

BACKGROUND OF THE INVENTION

Field of the Invention

The present disclosure relates to a connector for high-speed signal transmission with a rigid alignment function and, more particularly, to a connector that allows rigid alignment between pin arrays as a part of the connector moves slightly in the left-right or front-rear direction depending on the degree of engagement between corresponding pins when coupled to a counterpart connector.

Description of the Related Art

A board-to-board connector (BTB connector) is widely used to electrically connect circuit boards. When connectors are coupled, an electrical connection is made through matching between pins, enabling electrical signal transmission between a board and a board.

Recently, due to the demand for scalable computing, high-speed signal transmission connectors with high data rates of 28 Gbps, 56 Gbps, or 112 Gbps or more are required. In addition, with the miniaturization and slimming of the system applying the BTB connector, connectors with specifications such as high density, low profile, and low thermal resistance are required.

In order to meet these requirements, the number of connector pins increases, the pin pitch is further narrowed, the size of the pin becomes smaller, and the pin is getting thinner at the same time. Against this background, alignment has emerged as an important factor when mating connectors.

In other words, if the alignment between the connectors is not done properly, the electrical connection between pins may not be smoothly made, which may cause a problem in signal transmission. Moreover, in case of forcibly mating connectors in a situation where proper alignment between connector pins is not made, the pins may be easily damaged, and stress is continuously accumulated on a connector body, which can cause problems in which the coupling between the connectors becomes loose or the connector body itself is damaged.

In particular, in a high-speed signal transmission connector, the alignment between connectors is a more important issue because the entire system may malfunction due to a fine error in alignment of some pins.

In order to solve this connector alignment problem, various alignment methods have been proposed. In one of the conventional connector alignment methods, the alignment of pin arrays is made by fitting a connector's fastening part protrusion and an insertion groove in a fit-fitting manner, or self-alignment may be achieved as the fastening part slides on the inclined surface to be fastened.

However, in this conventional connector alignment method, there is a problem that the stress caused by the forced coupling is applied to pins as it is since the pins are forcibly coupled in a state where proper matching between the pin arrays is not made. There is also a problem that when the stress exceeds a certain level over time or with an increase in the frequency of fastening, the pins are eventually damaged or the fastening part is broken or becomes loose, and thus, proper alignment may not be performed afterwards.

DOCUMENTS OF RELATED ART (Patent Document 0001) Korean Patent No. 10-2031505
(Patent Document 0002) Korean Patent Application Publication No. 10-2020-0130144

SUMMARY OF THE INVENTION

Accordingly, the present disclosure has been made keeping in mind the above problems occurring in the related art, and the present disclosure is intended to provide a method for effectively aligning pin arrays when board-to-board connectors (BTB connectors) are coupled.

In particular, an objective of the present disclosure is to solve a problem that occurs when the conventional connector alignment method is used. That is, the stress caused by the forced coupling is applied to pins as it is since the pins are forcibly coupled in a state where proper matching between the pin arrays is not made.

In addition, an objective of the present disclosure is to solve a problem that when the stress exceeds a certain level over time or with an increase in the frequency of fastening, the pins are eventually damaged or the fastening part is broken or becomes loose, and thus, proper alignment may not be performed afterwards.

Moreover, an objective of the present disclosure is to solve a problem that the reliability of the signal transmission characteristics of a connector for high-speed signal transmission is deteriorated as the pin arrays are not properly aligned.

The objectives of the present disclosure are not limited to the above, and other objectives and advantages of the present disclosure not mentioned may be understood by the following description.

In order to achieve the above objective, according to an embodiment of the present disclosure, there is provided a connector, including: a pin array assembly with connector pins arranged; a base mold on which a lower end of the pin array assembly is mounted and supported; a top mold in which a middle portion of the pin array assembly is inserted and supported; and a fastening means configured to couple the base mold and the top mold, and to support rigid alignment by relatively moving the top mold with respect to the base mold according to a degree of engagement between corresponding pins when coupled to a counterpart connector.

The fastening means may include: a rigid fastening part formed to protrude in a vertical direction from a side of one of the base mold and the top mold; and a rigid insertion part formed wider than a cross-sectional length of the rigid fastening part on a side of a remaining one of the base mold and the top mold for the rigid fastening part to be inserted and fastened, wherein the base mold and the top mold may be coupled by a fastening of the rigid fastening part and the rigid insertion part, and the rigid fastening part may be moved in a cross-sectional length direction in the rigid insertion part according to the degree of engagement between corresponding pins when coupled to the counterpart connector to support rigid alignment.

As an example, the rigid fastening part may include: a fastening support leg formed to protrude vertically downward from a side of the top mold; and a fastening protrusion formed to protrude to an outside of the fastening support leg, and the rigid insertion part may include: a fastening hole formed on a side of the base mold to correspond to the rigid fastening part and formed to be wider than a cross-sectional length of the fastening support leg; and a locking jaw formed in the fastening hole so that the fastening protrusion engages therewith.

As an example, the rigid fastening part may be provided on a left side and a right side of the top mold, the rigid insertion part may be provided on a left side and a right side of the base mold to correspond to the rigid fastening part, and the top mold may be moved left or right relative to the base mold according to the degree of engagement between corresponding pins when coupled to the counterpart connector to support rigid alignment.

In addition, the rigid fastening part may be provided on an upper side and a lower side of the top mold, the rigid insertion part may be provided on an upper side and a lower side of the base mold to correspond to the rigid fastening part, and the top mold may be moved upward or downward relative to the base mold according to the degree of engagement between corresponding pins when coupled to the counterpart connector to support rigid alignment.

Furthermore, the connector of the present disclosure may further include: a coupling guide protrusion provided on one of an upper side or a lower side of the top mold to guide an initial alignment of coupling with the counterpart connector; and a coupling guide means having a coupling guide groove provided on a remaining one of the upper side or the lower side of the top mold to guide the initial alignment of coupling in correspondence with a coupling guide protrusion of the counterpart connector.

In addition, the connector of the present disclosure may further include: a coupling guide protrusion provided on one or more of a left side or a right side of the top mold to guide an initial alignment of coupling with the counterpart connector; and a coupling guide means having a coupling guide region provided on one or more of the left side or the right side of the top mold to guide the initial alignment of coupling in correspondence with a coupling guide protrusion of the counterpart connector.

As an example, the pin array assembly may include: a pin array in which a plurality of pins are arranged horizontally apart; a lower support in which a lower end of the pin array is inserted and supported, and configured to be coupled to the base mold; and an upper support in which a middle portion of the pin array is inserted and supported, configured to be coupled to the top mold, wherein the upper support may be moved with respect to the lower support according to the degree of engagement between corresponding pins when coupled to the counterpart connector to support rigid alignment.

The pin may include: a head area having a curved portion that is bent to protrude in one direction to match a pin of the counterpart connector, and whose end is bent to another direction; a tail area whose end is mounted on the base mold; and a body area that connects the head area and the tail area and has a through hole formed in a center thereof so as to be deformable in a width direction, wherein the body area may be deformed according to the degree of engagement between corresponding pins when coupled to the counterpart connector to support rigid alignment.

Furthermore, the connector of the present disclosure may further include: a cavity formed as a space in which the body area is positioned between the lower support coupled to the base mold and the upper support coupled to the top mold so as to support deformation of the body area when coupled to the counterpart connector.

As an example, the connector may be a hermaphroditic connector in which the pins of the pin array assembly are capable of selectively performing a function of a receptacle or a plug.

As another example, the connector may be a receptacle connector or a plug connector in which the pins of the pin array assembly perform either a function of a receptacle or a plug.

According to the present disclosure, it is possible to effectively aligning pin arrays when board-to-board connectors (BTB connectors) are coupled.

In particular, precise alignment of the pin arrays can be achieved while minimizing the physical stress on the connector pins since alignment is made between the pin arrays as a part of the connector moves slightly left and right or front and rear depending on the degree of engagement between corresponding pins when coupled to a counterpart connector.

Moreover, high-speed signal transmission characteristics can be realized by eliminating a fine error that inevitably occur when coupling connectors by means of rigid alignment.

In particular, reliability of signal transmission characteristics can be improved by applying the rigid alignment according to the present disclosure to a connector for high-speed signal transmission requiring high data rates of 28 Gbps, 56 Gbps, or 112 Gbps or more.

The effects of the present disclosure are not limited to those mentioned above, and other effects not mentioned will be clearly understood by those skilled in the art from this specification and accompanying drawings.

BRIEF DESCRIPTION OF THE DRAWINGS

The above and other objectives, features, and other advantages of the present disclosure will be more clearly understood from the following detailed description when taken in conjunction with the accompanying drawings, in which.

DETAILED DESCRIPTION OF THE INVENTION

Figure 1:
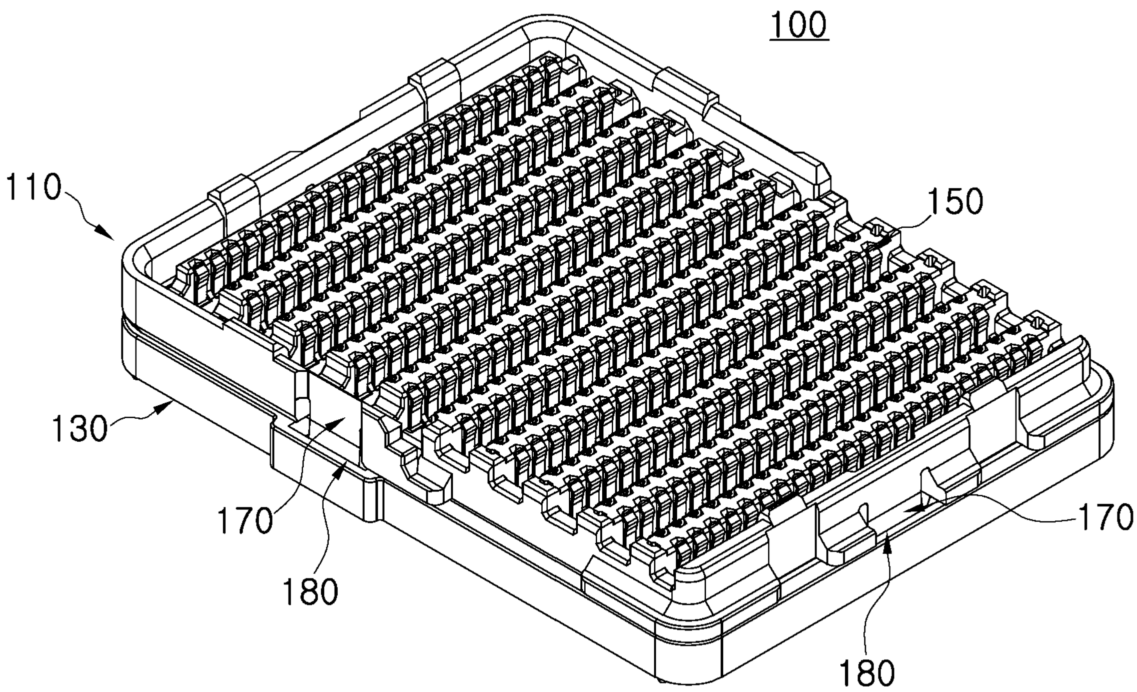
FIG. 1 is a perspective view of an embodiment of a connector for high-speed signal transmission with a rigid alignment function according to the present disclosure.

Hereinafter, embodiments of the present disclosure will be described in detail with reference to the accompanying drawings. However, the present disclosure is not limited by the embodiments.

In order to explain the present disclosure, the operational advantages of the present disclosure, and the objectives achieved by the practice of the present disclosure, the embodiments of the present disclosure are exemplified below and will be described with reference to them.

First, the terms used in this application are only used to describe specific embodiments, and are not intended to limit the present disclosure, and a singular expression may include a plural expression unless the context clearly indicates otherwise. In addition, it should be understood that in the present disclosure, terms such as "comprise" or "have" are intended to designate that a feature, number, step, operation, component, part, or combination thereof described in the specification exists, and do not preclude the possibility of addition or existence of one or more other features or numbers, steps, operations, components, parts, or combinations thereof.

In describing the present disclosure, when it is determined that a detailed description of a related known configuration or function may obscure the gist of the present disclosure, the detailed description thereof will be omitted.

The present disclosure proposes a connector for high-speed signal transmission. The connector allows rigid alignment between pin arrays as a part of the connector moves slightly left and right or front and rear depending on the degree of engagement between corresponding pins when coupled to a counterpart connector.

In the present disclosure, a new concept of rigid alignment is proposed, and the rigid alignment referred to in the present disclosure means that when a connector according to the present disclosure is coupled to a counterpart connector, forcible alignment with respect to pin arrays may be performed by relatively moving a part of a connector body according to the degree of engagement between corresponding pins.

To be specific, the connector according to the present disclosure is configured such that, while the lower end of the connector is mounted on a board to maintain a fixed state, the upper end of the connector may move relatively with respect to the lower end of the connector when it is coupled to the counterpart connector. Due to this structural configuration, when the connectors are coupled, the upper end of the connector is precisely aligned between the pin arrays, and an error generated when the two connectors are coupled may be resolved by the relative movement of the connector.

In particular, it is intended to improve the reliability of signal transmission characteristics by applying the rigid alignment according to the present disclosure to a connector for high-speed signal transmission requiring high data rates of 8 Gbps, 56 Gbps, or 112 Gbps or more.

Hereinafter, the rigid alignment function presented in the present disclosure and the connector according to the present disclosure will be described through various embodiments.

Figure 2:
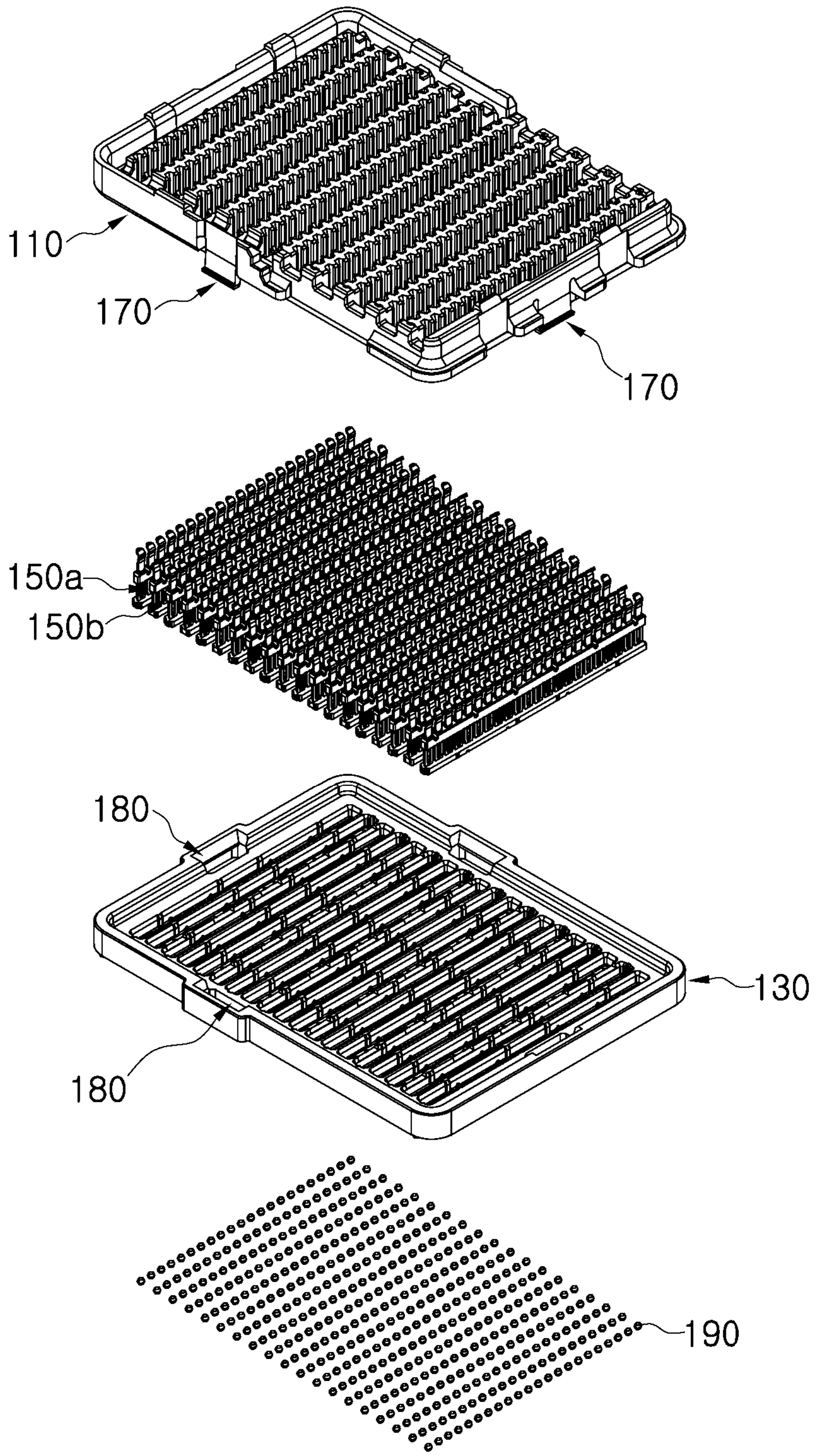
FIG. 2 is an exploded perspective view viewed from the upper side of the embodiment of the connector for high-speed signal transmission with a rigid alignment function according to the present disclosure.
Figure 3:
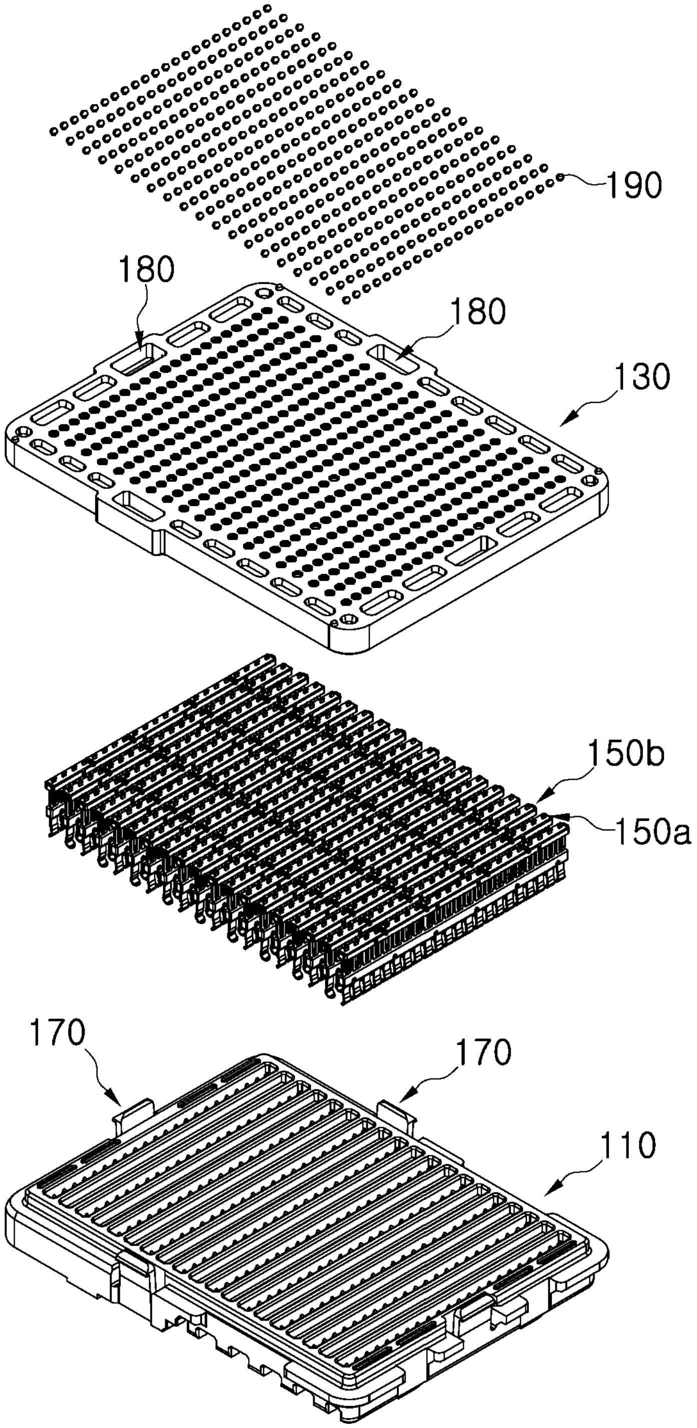
FIG. 3 is an exploded perspective view viewed from the lower side of the embodiment of the connector for high-speed signal transmission with a rigid alignment function according to the present disclosure.

FIG. 1 is a perspective view of an embodiment of a connector for high speed signal transmission with a rigid alignment function according to the present disclosure, FIG. 2 is an exploded perspective view viewed from the upper side of the embodiment of the connector for high speed signal transmission with a rigid alignment function according to the present disclosure, and FIG. 3 is an exploded perspective view viewed from the lower side of the embodiment of the connector for high speed signal transmission with a rigid alignment function according to the present disclosure.

The connector 100 according to the present disclosure may include a top mold 110, a base mold 130, and a pin array assembly 150.

A plurality of pin array assemblies 150$a$ and 150$b$ are arranged and seated on the base mold 130 in the longitudinal direction, and the top mold 110 may be seated and mounted thereon. The pin array assembly 150 may include a plurality of pins arranged in a transverse direction and a support for supporting the arranged pins.

The pin array assembly 150 may be mounted on the base mold 130 in a solder ball 190 bonding method. Ends of the plurality of pin array assemblies 150$a$ and 150$b$ arranged in the longitudinal direction may be mounted on the base mold 130 in a ball grid array (BGA) method, and the connector 100 may be seated and fixed to a substrate (not shown) by means of the solder balls 190 on the lower surface of the base mold 130.

At this time, the solder ball bonding method for seating the connector 100 on the substrate is one embodiment, and various bonding methods may be applied.

The base mold 130 and the top mold 110 may be coupled by a fastening means. Here, the fastening means may include a rigid fastening part 170 and a rigid insertion part 180.

Although it has been illustrated and described that the rigid fastening part 170 is provided in the top mold 110 and the rigid insertion part 180 is provided in the base mold 130 in the above embodiment, the rigid insertion part 180 may be provided in the top mold 110 and the rigid fastening part may be provided in the base mold 130.

The connector 100 according to the present disclosure is configured such that alignment of the pin arrays is achieved by slightly moving the top mold 110 in the left and right or front and rear directions based on the base mold 130 fixedly mounted on a board according to the degree of engagement between the pins to compensate for the coupling error when coupled with the mating connector. At this time, as the top mold 110 is slightly moved with respect to the base mold 130, a corresponding amount of deformation may occur in the pin array assembly 150 mounted therein. Deformation of the pin array assembly 150 for alignment may be possible by means of the structure presented in the present disclosure.

Each configuration of the connector 100 according to the present disclosure will be described with reference to the embodiments together.

Figure 4:
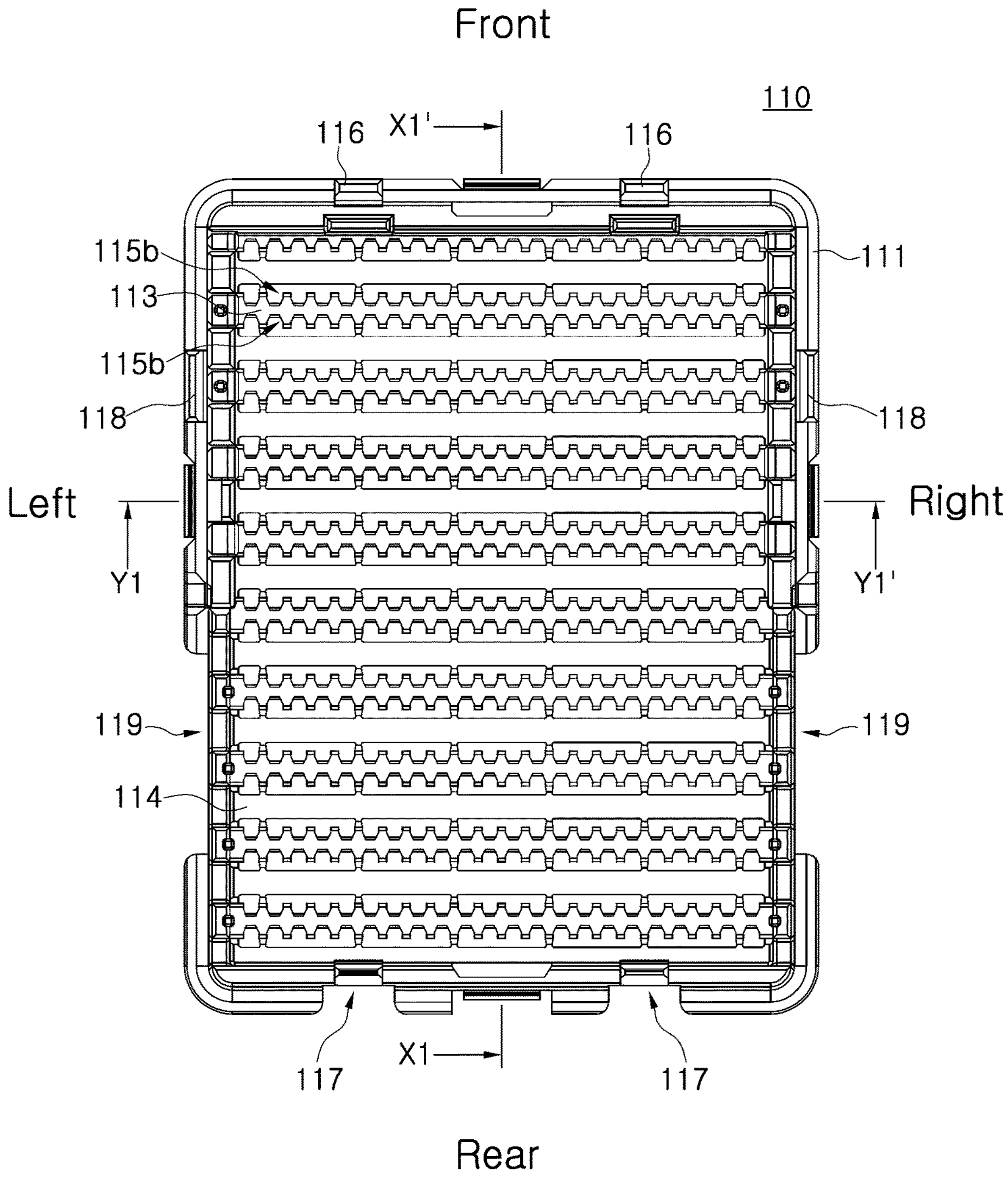
FIG. 4 is a plan view of an embodiment of a top mold in the connector for high-speed signal transmission with a rigid alignment function according to the present disclosure.
Figure 5A:
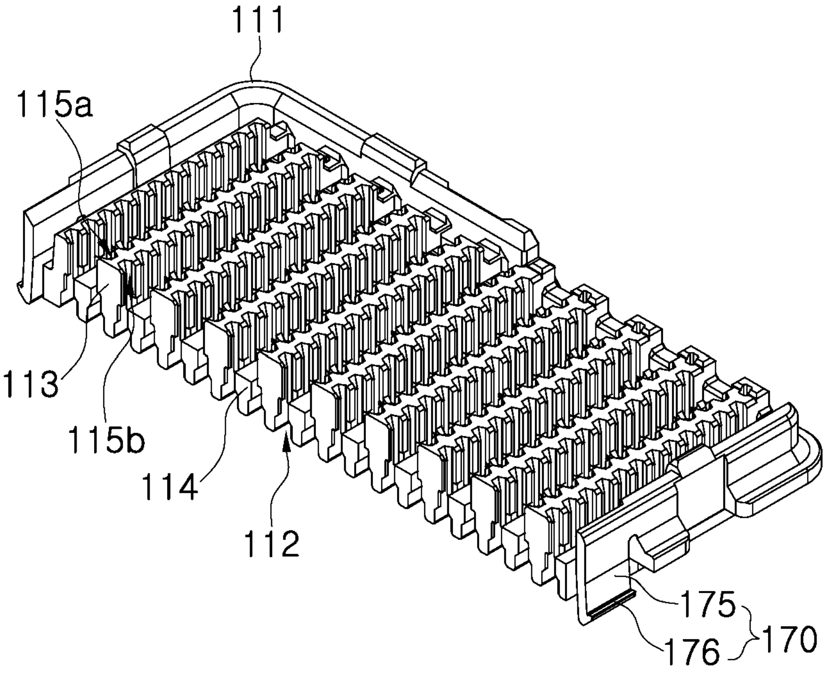
FIGS. 5A and 5B are cut-away views of the embodiment of the top mold of FIG. 4.
Figure 5B:
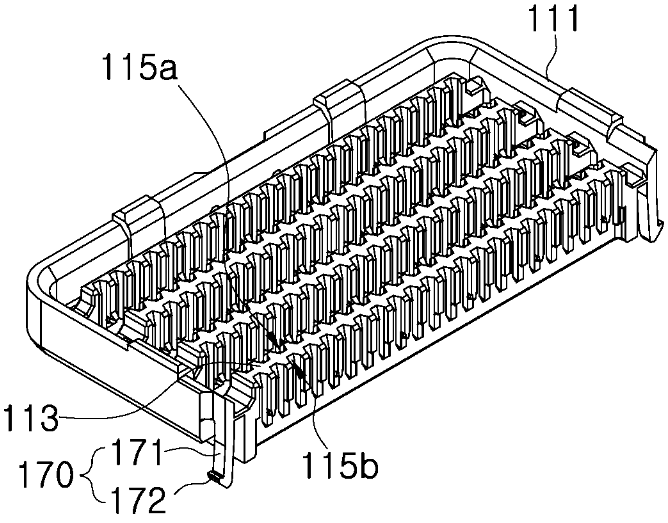

FIG. 4 is a plan view of an embodiment of a top mold in the connector for high-speed signal transmission with a rigid alignment function according to the present disclosure, FIG. 5A is a cut-away view taken in the X1-X1' direction of the embodiment of FIG. 4, and FIG. 5B is a cut-away view taken in the Y1-Y1' direction of the embodiment of FIG. 4.

The top mold 110 may include a top body frame 111 and a plurality of main partition walls 113 and a plurality of sub partition walls 114 spaced apart from each other in the longitudinal direction inside the top body frame 111.

A mounting slot 112 into which a middle portion of the pin array assembly 150 may be inserted may be provided in a space between the main partition wall 113 and the sub partition wall 114.

The main partition wall 113 may be provided with pin seating spaces 115*a* and 115*b* in which the head areas of the respective pins, arranged in the transverse direction of the pin array assembly 150 on both sides of the main partition wall 113, are inserted and seated. Each of the pin seating spaces 115*a* and 115*b* may be provided as a space larger than the pin head area by a certain level so that the pin head area may be moved within a certain range. Each of the pin seating spaces 115*a* and 115*b* may be foiled in a slot-shaped space with one side open to allow movement in the front-rear direction of the pin head area while limiting movement in the left-right direction of the pin head area.

A plurality of pin array assemblies 150*a* and 150*b* may be inserted and mounted on the mounting slot 112 provided by the main partition wall 113 and the sub partition wall 114 in the longitudinal direction. At this time, the plurality of pin array assemblies 150*a* and 150*b* may be alternately mounted while changing the insertion direction thereof.

The rigid fastening part 170 may be provided at the middle of the left side and the right side of the top body frame 111 of the top mold 110. The rigid fastening part 170 may include: a fastening support leg 171 formed by protruding vertically downward from the middle of the left side and right side of the top body frame 111; and a fastening protrusion 172 protruding outward from the end of the fastening support leg 171.

The rigid fastening part 170 may also be provided at the middle of the upper side and the lower side of the top body frame 111 of the top mold 110. The rigid fastening part 170 may include: a fastening support leg 175 formed by protruding vertically downward from the middle of the left side and right side of the top body frame 111; and a fastening protrusion 176 protruding outward from the end of the fastening support leg 175. Although it has been illustrated and described that the rigid fastening part 170 is provided on each of the left side and right side, and the upper side and the lower side of the top mold 110 in the present embodiment, the arrangement number, arrangement position, shape, etc. of the rigid fastening part 170 may be selectively variously modified depending on the situation.

In addition, a coupling guide protrusion 116 may be provided on the upper side of the top mold 110, which protrudes outward to guide the initial alignment of mating with the mating connector. The coupling guide protrusion 116 may be provided on each side based on the center of the upper side.

A coupling guide groove 117 may be provided on the lower side of the top mold 110 to guide the initial alignment of the coupling corresponding to the coupling guide protrusion of the mating connector. The arrangement position and number of the coupling guide grooves 117 may be adjusted to correspond to the arrangement position and number of the mating guide protrusion of the mating connector.

In addition, a coupling guide protrusion 118 may be provided on the upper end of the left side of the top mold 110 and the upper end of the right side of the top mold 110, which protrudes outward to guide the initial alignment of mating with the mating connector, and at the lower end of the left side and the lower end of the right side of the top mold 110, a coupling guide region 119 formed by recessing a certain part inward to guide the initial alignment of mating corresponding to the coupling guide protrusion of the mating connector may be provided.

Due to the coupling guide means consisting of the coupling guide protrusion and coupling guide groove or coupling guide protrusion, the initial alignment of mating between connectors may be properly induced.

In this embodiment, it has been illustrated and described that the coupling guide protrusion 116 is provided on the upper side of the top mold 110 and the coupling guide groove 117 is provided on the lower side of the top mold 110, but depending on the situation, the arrangement position and number of the coupling guide protrusion and the coupling guide groove may be selectively variously modified.

Figure 6:
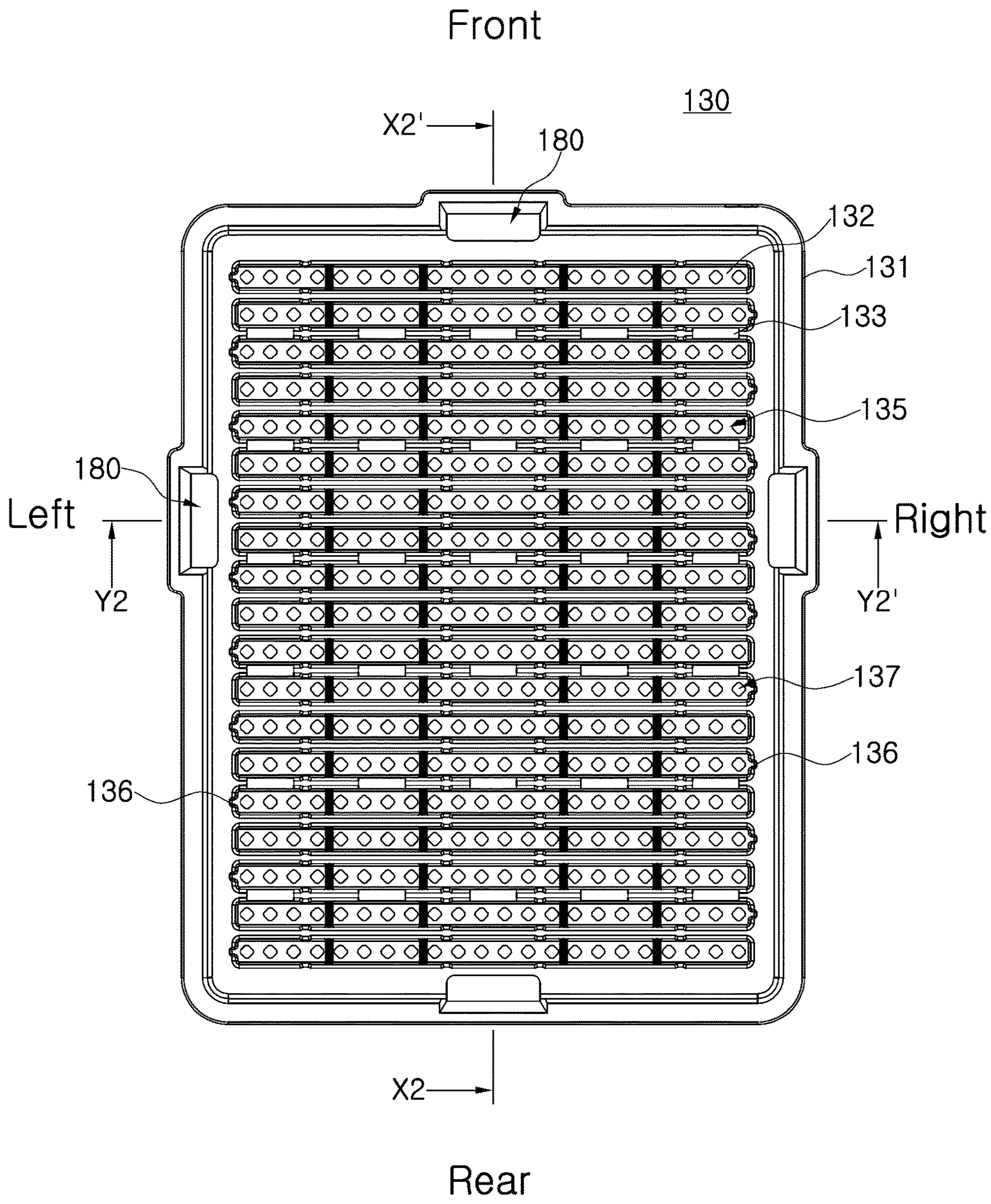
FIG. 6 is a plan view of an embodiment of a base mold in the connector for high-speed signal transmission with a rigid alignment function according to the present disclosure.
Figure 7A:
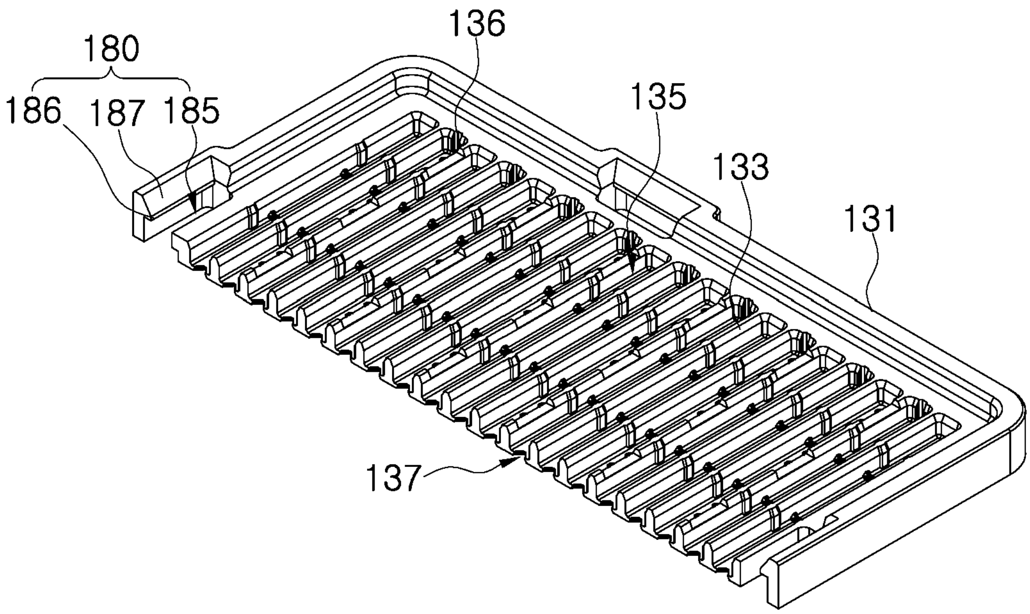
FIGS. 7A and 7B are cut-away views of the embodiment of the base mold of FIG. 6.
Figure 7B:
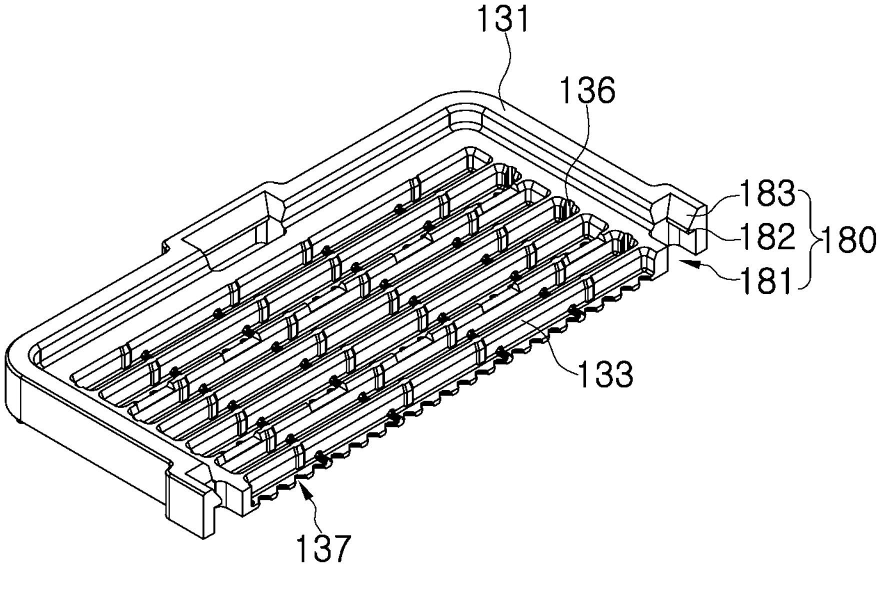

FIG. 6 is a plan view of an embodiment of a base mold in the connector for high-speed signal transmission with a rigid alignment function according to the present disclosure, FIG. 7A is a cut-away view taken along the X2-X2' direction of the embodiment of FIG. 6, and FIG. 7B is a cut-away view taken along the Y2-Y2' direction of the embodiment of FIG. 6.

The base mold 130 may include a base body frame 131, a base bottom surface 132, and a mounting partition wall 133. In an embodiment, the mounting partition wall 133 may be provided in plural.

The mounting partition walls 133 are provided in the inside of the base body frame 131 and spaced apart along the longitudinal direction, and a mounting groove 135 into which an end portion of the pin array assembly 150 can be inserted and mounted may be provided in a space between the mounting partition walls 133. In an embodiment, the mounting groove 135 may be provided in plural.

A plurality of mounting grooves 135 may be provided along the longitudinal direction by the plurality of mounting partition walls 133 provided to be spaced apart along the longitudinal direction.

As described above, the plurality of pin array assemblies 150*a* and 150*b* may be alternately mounted while changing the insertion direction. In order to more easily distinguish the mounting direction, a directional groove 136 may be formed at one end of the mounting groove 135 so that a directional protrusion of the pin array assembly 150 can be matched and inserted.

A mounting hole 137 in which the solder ball 190 is seated on the lower surface thereof and the end of the pin array assembly 150 is inserted and mounted on the upper surface thereof may be famed in the base bottom surface 132. The mounting hole 137 may be formed in such a size that an end portion of a pin tail area of the pin array assembly 150 can be inserted in one direction and a portion of the solder ball 190 can be inserted in the other direction.

Although the mounting hole 137 is illustrated as a rhombic through hole in this embodiment, the mounting hole may be formed in various shapes in which the solder ball can be stably seated. As an example, the shape of the mounting hole 137 may be variously changed to a circle, an oval, a polygon, etc. in consideration of the shape of the end portion of the pin tail area and the size of the solder ball, and the cross-sectional size of the through hole may also be changed. The size and shape of the through hole of the mounting hole 137 may be determined in consideration of high-speed signal transmission characteristics of the connector and stability when the connector is mounted on a board.

The rigid insertion part 180 may be provided in the middle of the left side and in the middle of the right side of the base body frame 131 of the base mold 130 to correspond to the rigid fastening part 170 of the top mold 110.

The rigid insertion part 180 may include: a fastening hole 181 formed in the middle of the left side and in the middle of the right side of the base body frame 131; and a locking jaw 182 protruding from the inside of the fastening hole 181. At the upper end of the locking jaw 182, an inclined portion 183 may be provided to guide the rigid fastening part 170 to the fastening hole 181.

In addition, the rigid insertion part 180 may also be provided in the middle of the upper side and in the middle of the lower side of the base body frame 131 of the base mold 130 in correspondence with the rigid fastening part 170 of the top mold 110. Likewise in this case, the rigid insertion part 180 may include a fastening hole 185 formed in the middle of the upper side and in the middle of the lower side of the base body frame 131, and a locking jaw 186 protruding from the inside of the fastening hole 185, and at the upper end of the locking jaw 186, an inclined portion 187 may be provided to guide the rigid fastening part 170 to the fastening hole 185.

In this embodiment, it is illustrated and described that the rigid insertion part 180 is provided on each of the left side and right side and upper side and lower side of the base mold 130 corresponding to the embodiment of the top mold 110 discussed above. However, in correspondence with the deformation of the rigid fastening part 170, the arrangement number, arrangement position, shape, etc. of the rigid insertion part 180 may be selectively and variously modified.

Figure 8:
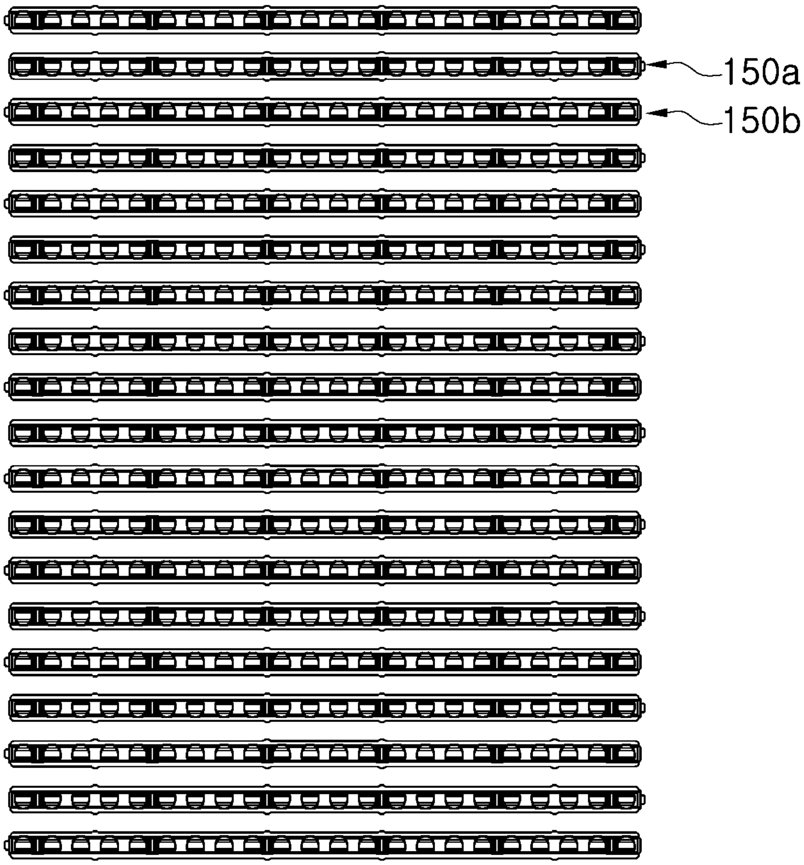
FIG. 8 is a plan view of an embodiment in which a plurality of pin array assemblies are arranged in the connector for high-speed signal transmission with a rigid alignment function according to the present disclosure.
Figure 9:
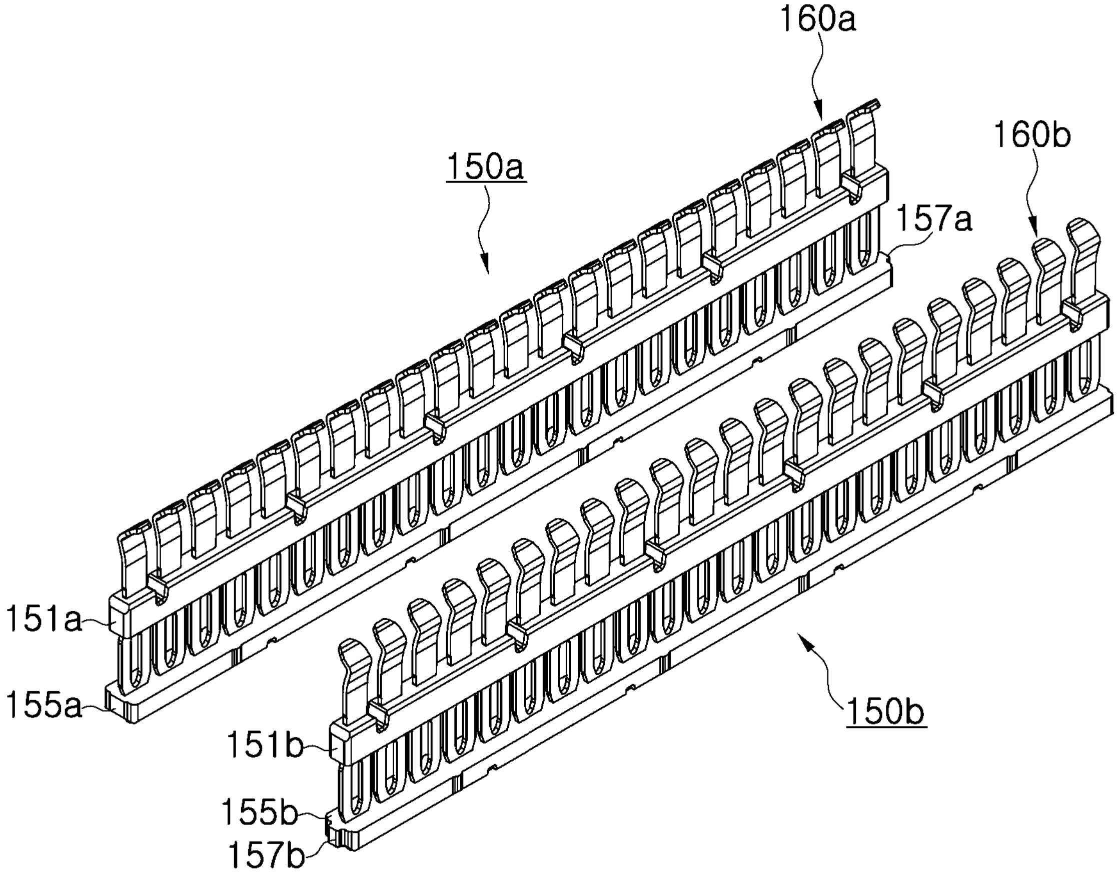
FIG. 9 is a view showing the pin array assemblies of FIG. 8.

FIG. 8 is a plan view of an embodiment in which a plurality of pin array assemblies are arranged in the connector for high-speed signal transmission with a rigid alignment function according to the present disclosure, and FIG. 9 is a view showing the pin array assemblies of FIG. 8.

Each of the plurality of pin array assemblies 150*a* and 150*b* may include a plurality of pins 160*a* and 160*b*, upper supports 151*a* and 151*b*, and lower supports 155*a* and 155*b*.

The plurality of pins 160*a* and 160*b* may be arranged to be spaced apart along the lateral direction, and the arranged plurality of pins 160*a* and 160*b* may be supported by the upper supports 151*a* and 151*b* and the lower supports 155*a* and 155*b*.

As an example, in a state in which the plurality of pins 160*a* and 160*b* are arranged to be spaced apart along the lateral direction, the upper supports 151*a* and 151*b* and the lower supports 155*a* and 155*b* may be molded to form the pin array assemblies 150*a* and 150*b*.

The upper supports 151*a* and 151*b* may be inserted and mounted in the mounting slot 112 of the top mold 110, and the lower supports 155*a* and 155*b* may be inserted and mounted in the mounting groove 135 of the base mold 130.

The plurality of pin array assemblies 150*a* and 150*b* may be mounted while changing the insertion direction by alternating insertion directions. As described above in the embodiment of the top mold 110, the pin seating spaces 115*a* and 115*b* provided in the main partition wall 113 of the top mold 110 have insertion directionality of the pin array assemblies 150*a* and 150*b*, and accordingly, the plurality of pin array assemblies 150*a* and 150*b* may be inserted and mounted in the top mold 110 by matching the mounting insertion directions.

In addition, at one ends of the lower supports 155*a* and 155*b* of the pin array assemblies 150*a* and 150*b*, directional protrusions 157*a* and 157*b* for distinguishing directions are formed. The plurality of pin array assemblies 150*a* and 150*b* may be inserted and mounted in the base mold 130 by aligning the directional protrusions 157*a* and 157*b* of the pin array assemblies 150*a* and 150*b* with the directional grooves 136 of the base mold 130.

Figure 10A:
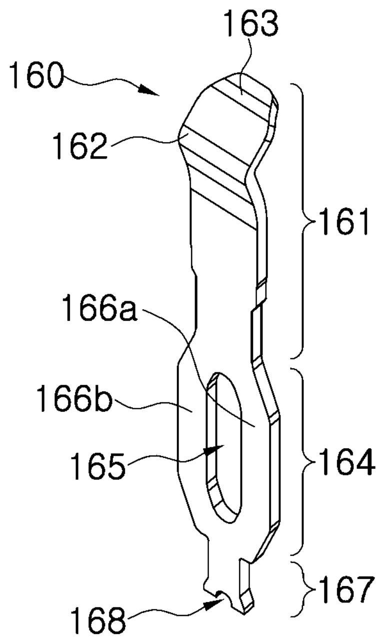
FIGS. 10A and 10B are views showing an embodiment of a pin configured in the pin array assemblies of FIG. 9.
Figure 10B:
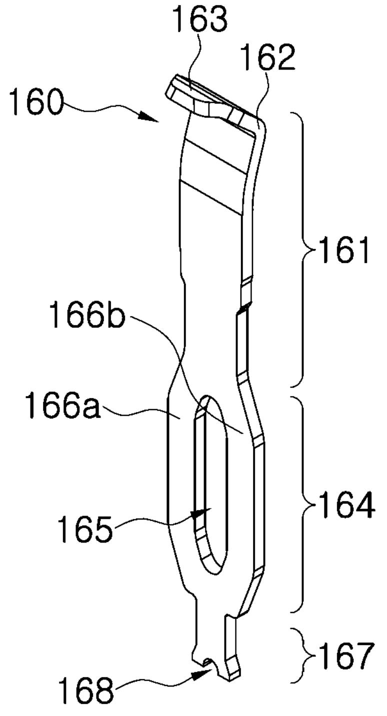

FIGS. 10A and 10B are views showing an embodiment of a pin configured in the pin array assemblies of FIG. 9.

The pin 160 may include a head area 161, a body area 164, and a tail area 167.

The head area 161 of the pin 160 may include a curved portion 162 that is bent to protrude in one direction to match the pin of the mating connector, and a stub 163 whose end is curved in the other direction.

Since the head area 161 of the pin 160 has an S-shaped double contact structure, when the connector is coupled with the mating connector, the reliability of contact with the mating pin may be further improved.

Due to the shape of the head area 161 of the pin 160, the pin array assembly 150 in which the pins 160 are arranged has directionality.

The tail area 167 may have an end portion 168 mounted on the base mold 130. The end portion 168 of the tail area 167 may be inserted into the mounting groove 135 of the base mold 130 and mounted by the solder ball 190.

The end portion 168 of the tail area 167 of the pin 160 may be variously deformed into a semicircular shape recessed inward or a bending shape bent to one side, etc. to increase the contact area with the solder ball 190 to achieve a more robust mounting.

The body area 164 connects the head area 161 and the tail area 167, and may include a through hole 165 formed in the center thereof.

Since the pin 160 is thin, it is easy to bend at a certain level in the thickness direction, but it is not easy to bend and deform in the width direction because it has a certain level of width. In order to maintain a certain level of contact area with the corresponding pin when combined with the mating connector, the width cannot be reduced below a certain level. Due to this functional problem, bending deformation in the width direction of the pin 160 becomes impossible.

However, in the present disclosure, deformation in the width direction is possible in the body area 164 by means of the through hole 165 of the body area 164.

The body area 164 may be divided into two pin body bars 166*a* and 166*b* by forming the through hole 165 in the center of the body area 164, and since the width of the pin body bars 166*a* and 166*b* can be reduced to a certain level by adjusting the size of the through hole 165, deformation in the width direction is possible in the body area 164 while deformation in the width direction is impossible in the head area 161 and the tail area 167 of the pin.

In this way, rigid alignment may be supported by enabling deformation in the width direction in the body area 164 of the pin 160, which will be described later with reference to the embodiment.

Figure 11:
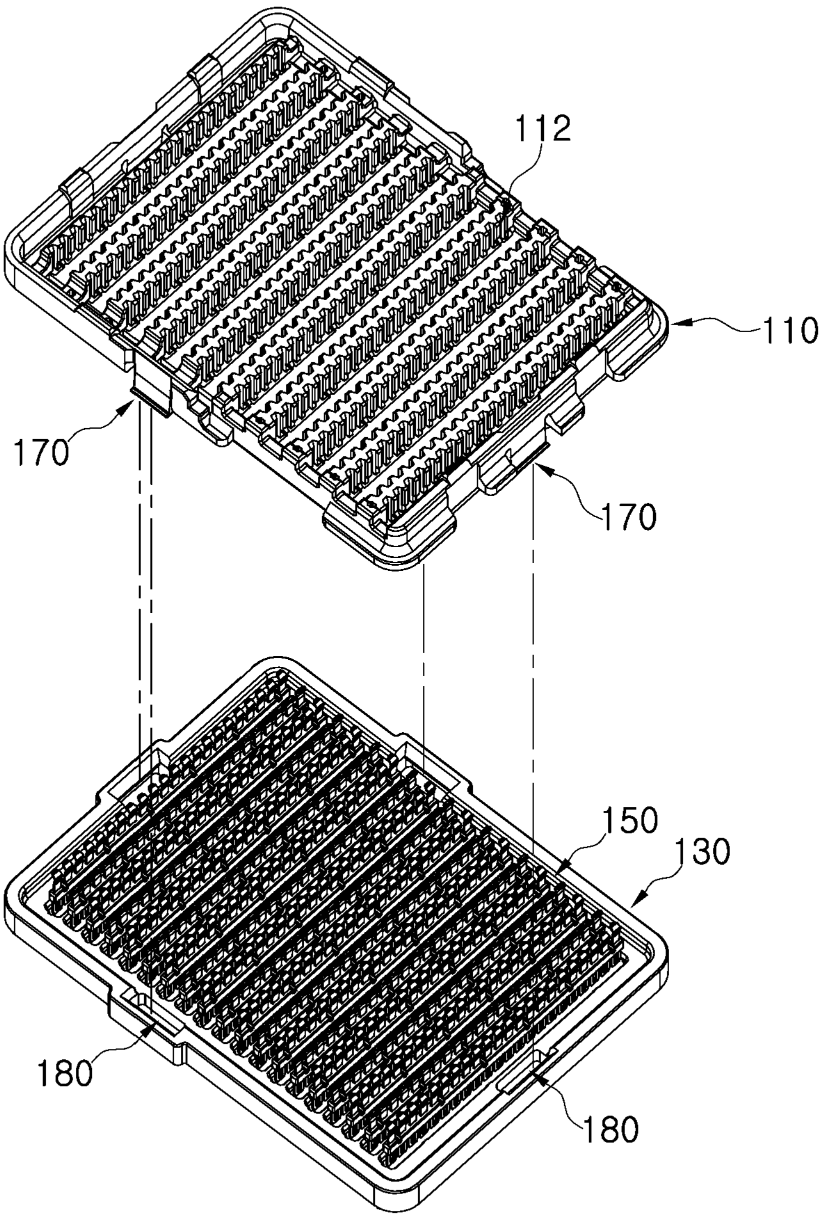
FIG. 11 is a view of an embodiment of assembling the top mold to the base mold on which pin array assemblies are disposed in the connector for high-speed signal transmission with a rigid alignment function according to the present disclosure.
Figure 12:
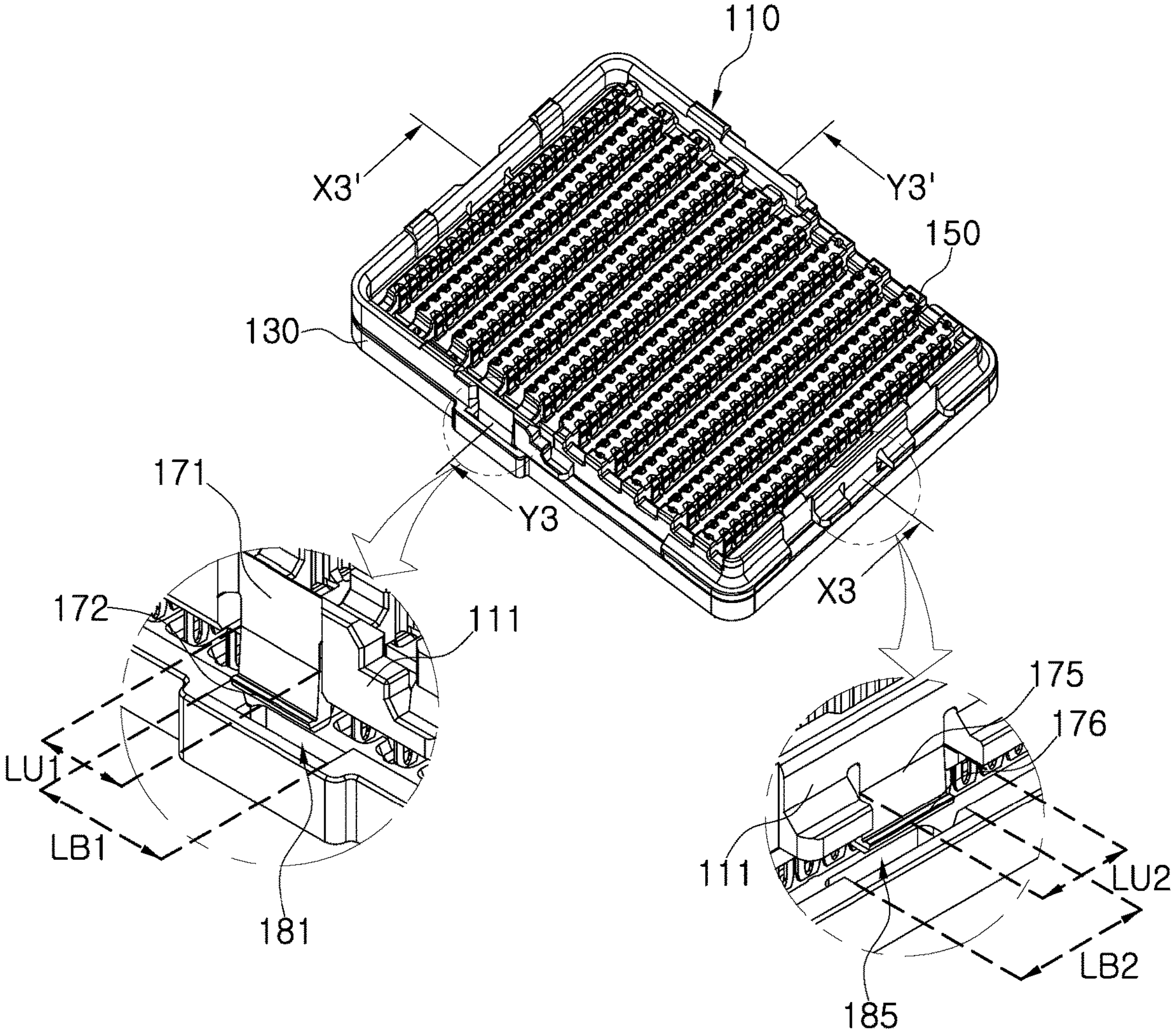
FIG. 12 is an enlarged view of a fastening means in the embodiment of the connector of FIG. 11.
Figure 13A:
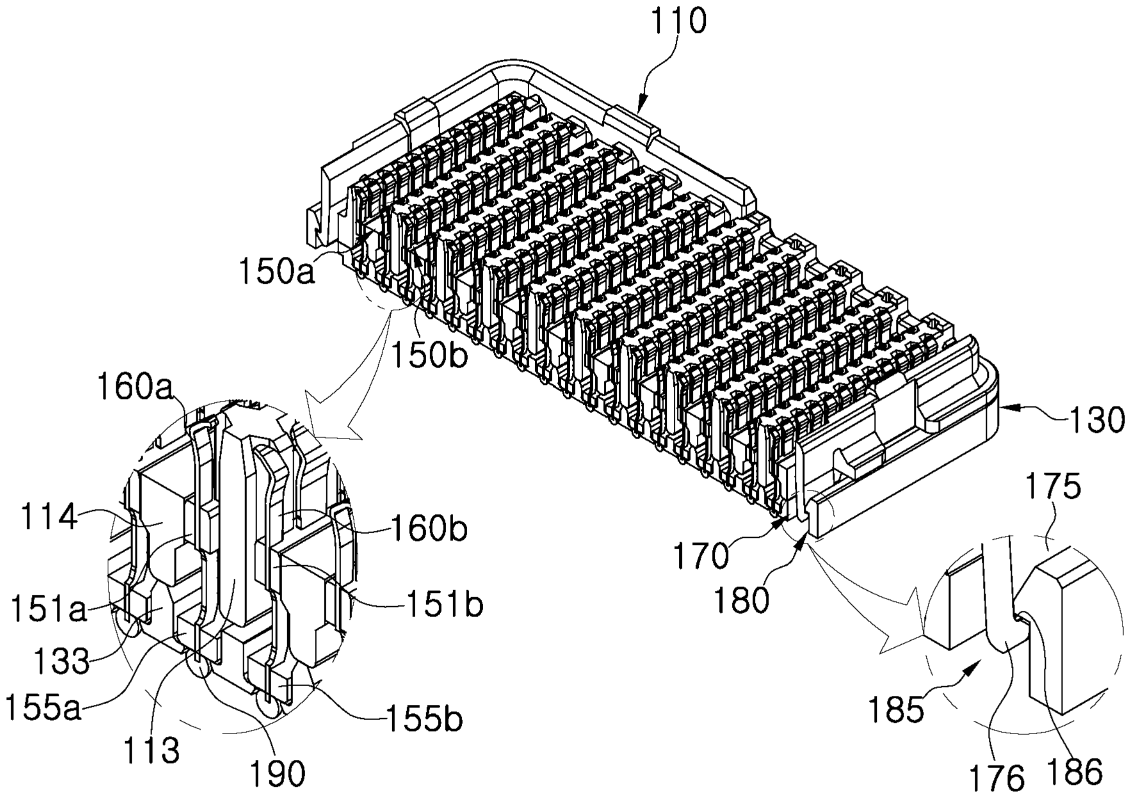
FIGS. 13A and 13B are cut-away views of the embodiment of the connector of FIG. 12.
Figure 13B:
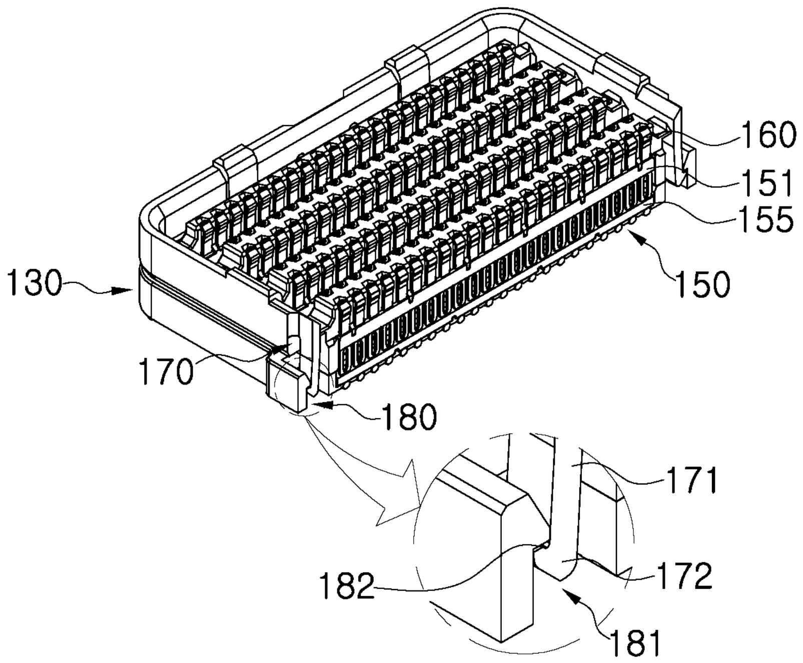

FIG. 11 is a view of an embodiment of assembling the top mold to the base mold on which pin array assemblies are disposed in the connector for high-speed signal transmission with a rigid alignment function according to the present disclosure, FIG. 12 is an enlarged view of a fastening means in the embodiment of the connector of FIG. 11, and FIGS. 13*a* and 13*b* are cut-away views of the embodiment of the connector of FIG. 12.

In describing FIGS. 11 to 13B, the description will be made with reference to FIGS. 1 to 10, which are an embodiment of each configuration discussed above.

In a state in which the pin array assembly 150 is inserted and seated in the base mold 130, the top mold 110 may be assembled thereon. When assembling the top mold 110 on the base mold 130, the pin array assembly 150 may be inserted into the mounting slot 112 of the top mold 110 to be mounted on the top mold 110.

Conversely, in a state in which the pin array assembly 150 is inserted and mounted in the mounting slot 112 of the top mold 110, the base mold 130 may be assembled under the top mold 110.

The plurality of pin array assemblies 150*a* and 150*b* have directionalities according to the arranged pins 160*a* and 160*b*, and the plurality of pin array assemblies 150*a* and 150*b* may be installed in the mounting grooves 135 provided on the mounting partition walls 133 of the base mold 130 by alternately changing the insertion direction. The lower supports 155*a* and 155*b* of the pin array assemblies 150*a* and 150*b* may be fixedly supported by being inserted into the mounting grooves 135 of the base mold 130.

The tail area end portion of each of the pins 160*a* and 160*b* of the plurality of pin array assemblies 150*a* and 150*b* may be inserted into the mounting groove 135 of the base mold 130 and mounted by the solder ball 190.

In addition, the pin array assemblies 150*a* and 150*b* may be inserted and mounted in the mounting slots 112 provided by the main partition walls 113 and the sub partition walls 114 of the top mold 110.

The pin seating spaces 115*a* and 115*b* are provided in the main partition walls 113 of the top mold 110, and each of the pins 160*a* and 160*b* of the plurality of pin array assemblies 150*a* and 150*b* may be seated in the pin seating spaces 115*a* and 115*b* according to the directionality. The upper supports 151*a* and 151*b* of the pin array assemblies 150*a* and 150*b* may be fixedly supported by being inserted into the mounting slot 112 of the top mold 110.

The assembly of the base mold 130 and the top mold 110 may be done by a coupling means, that is, the rigid fastening part 170 of the top mold 110 may be inserted and fastened according to the rigid insertion part 180 provided in the base mold 130.

The fastening protrusions 172 and 176 formed at the ends of the fastening support legs 171 and 175 of the rigid fastening part 170 are engaged with the locking jaws 182 and 186 formed in the fastening holes 181 and 185 of the rigid insertion part 180, so that the top mold 110 is mounted on the upper part of the base mold 130. By engaging the fastening protrusions 172 and 176 with the locking jaws 182 and 186, the top mold 110 may be fixed so as not to be separated from the base mold 130.

The rigid fastening part 170 may be slightly movable in the horizontal direction in the rigid insertion part 180 since the space of each of the fastening holes 181 and 185 of the rigid insertion part 180 is wider than the cross-sectional length of each of the fastening support legs 171 and 175 of the rigid fastening part 170.

In other words, the space length LB1 of the fastening hole 181 formed in the middle of the left and right sides of the base body frame 131 of the rigid insertion part 180 may be formed wider than the width length LU1 of the fastening support leg 171 formed at the middle of the left and right sides of the top body frame 111 of the rigid fastening part 170 by a predetermined value. As an example, the space length LB1 of the fastening hole 181 may be formed to have a length 0.25 mm to 0.5 mm longer than the width length LU1 of the fastening support leg 171. This is an example, and the ratio of the difference between the space length LB1 of the fastening hole 181 and the width length LU1 of the fastening support leg 171 may be adjusted to increase or decrease as needed.

In addition, the space length LB2 of the fastening hole 185 formed in the middle of the upper and lower sides of the base body frame 131 of the rigid insertion part 180 may be formed wider than the width length LU2 of the fastening support leg 175 formed at the middle of the upper and lower sides of the top body frame 111 of the rigid fastening part 170 by a predetermined value. As described above, the space length LB2 of the fastening hole 185 may be formed to have a length 0.25 mm to 0.5 mm longer than the width length LU2 of the fastening support leg 175. This is an example, and the ratio of the difference between the space length LB2 of the fastening hole 185 and the width length LU2 of the fastening support leg 175 may be adjusted to increase or decrease as needed.

As described above, the rigid fastening part 170 in the rigid insertion part 180 is able to move slightly in the left-right direction and the front-rear direction, and thus, rigid alignment may be performed between the pin arrays while the top mold 110 moves slightly in the left-right direction and the front-rear direction with respect to the base mold 130 when coupled with the mating connector.

Moreover, as the top mold 110 moves in the left-right direction and the front-rear direction with respect to the base mold 130, the pin array assembly 150 may also be deformed. A structure of the pin array assembly 150 mounted on the top mold 110 and the base mold 130 will be described with reference to FIG. 14.

Figure 14:
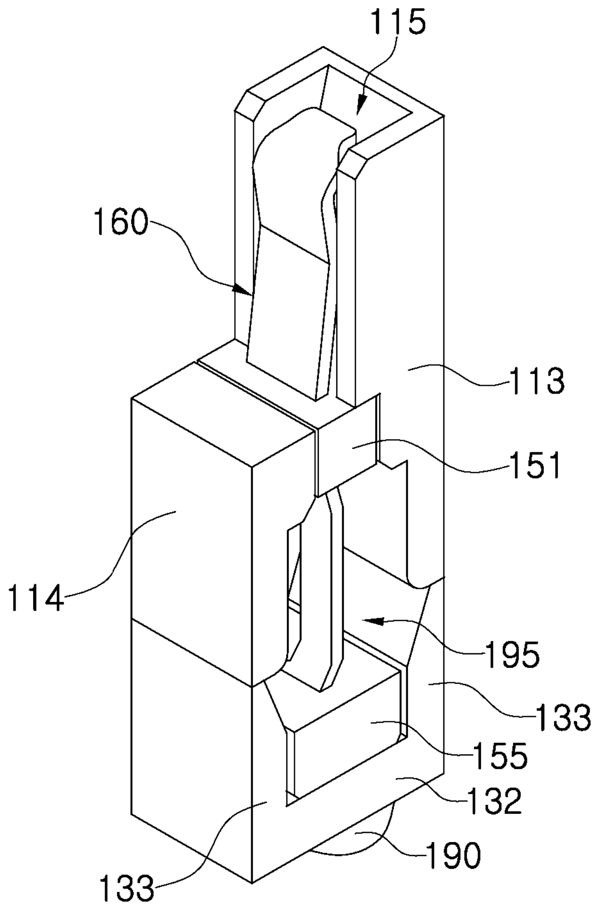
FIG. 14 is a view showing an example of a mounting configuration for a pin of the pin array assembly in the embodiment of the connector of FIG. 12.

FIG. 14 is a view showing an example of a mounting configuration for a pin of the pin array assembly in the embodiment of the connector of FIG. 12.

The pin 160 may be supported by the upper support 151 and the lower support 155.

The upper support 151 may be inserted and supported in the mounting slot 112 provided between the main partition wall 113 and the sub partition wall 114 of the top mold 110. The head area 161 of the pin 160 may be seated in the pin seating space 115 provided in the main partition wall 113, and the head area 161 of the pin 160 is restricted from moving in the left-right direction by the pin seating space 115, but may be movable in the front-rear direction. Due to this, when the connector is coupled to the mating connector, the pin 160 may be moved by the elastic force in the front-rear direction to be in contact with the mating pin.

The lower support 155 may be supported by being inserted into the mounting groove 135 provided between the mounting partition walls 133 of the base mold 130. The end portion of the tail area 167 of the pin 160 may be inserted into the mounting groove 135 provided on the base bottom surface 132 of the base mold 130 to be mounted by the solder ball 190.

A cavity 195 space may be formed between the lower support 155 coupled to the base mold 130 and the upper support 151 coupled to the top mold 110. The body area 164 of the pin 160 may be positioned in the cavity 195 space.

The body area 164 of the pin 160 is formed with a through hole 165 to enable bending deformation in the width direction. Since the body area 164 of the pin 160 is positioned in the cavity 195, which is an empty space, there is no physical restriction when bending and deforming in the left-right direction, which is the width direction.

The connector according to the present disclosure as described above is configured such that rigid alignment may be performed between the pin arrays while a part of the connector is slightly moved in the left and right or front and rear directions depending on the degree of engagement between the pins when coupled with the counterpart connector. Hereinafter, a function of performing rigid alignment by coupling the connector according to the present disclosure with the counterpart connector will be described.

Figure 15:
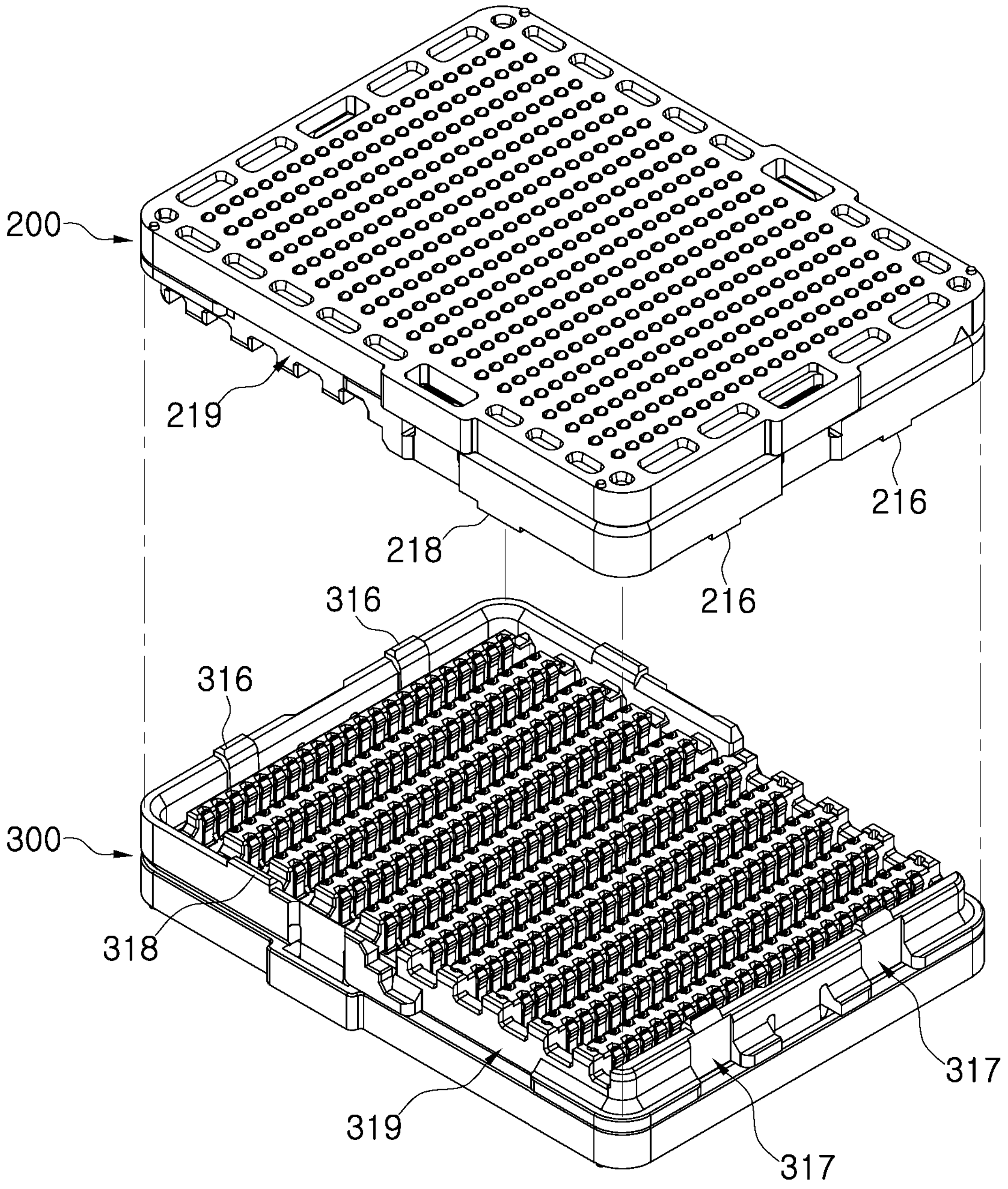
FIGS. 15 and 16 are views showing an example in which two connectors according to the present disclosure are coupled.
Figure 16:
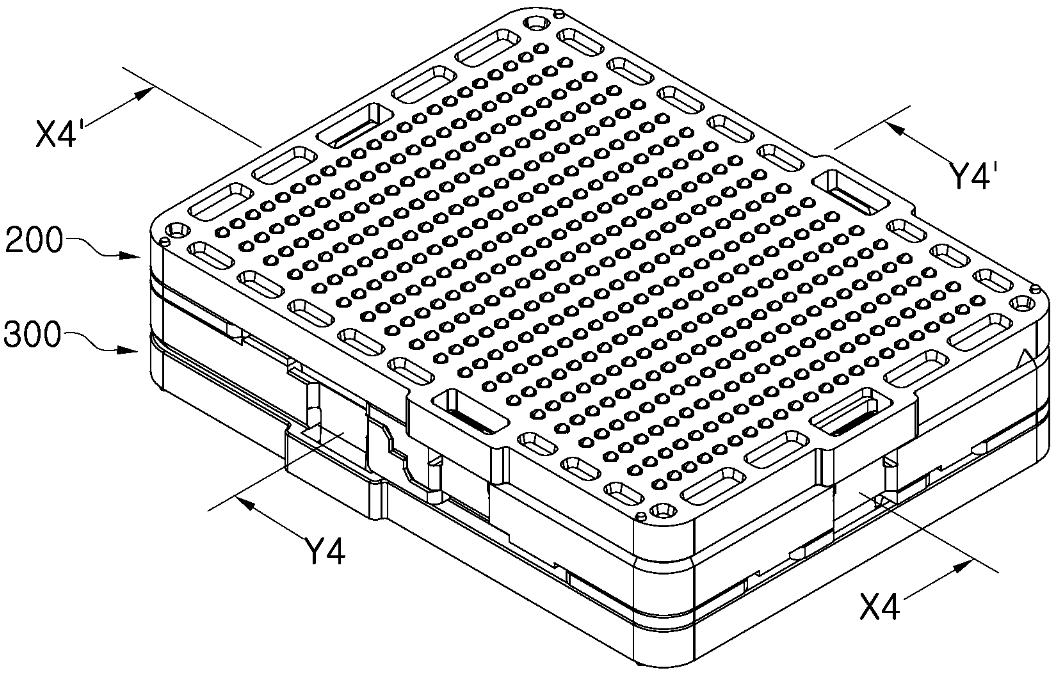

FIGS. 15 and 16 are views showing an example in which two connectors according to the present disclosure are coupled.

FIGS. 15 and 16 show a case in which the connector according to the present disclosure is applied as both an upper connector 200 coupled at the top and a lower connector 300 coupled at the bottom. As another example, the connector according to the present disclosure may be applied as any one of the two connectors to be coupled, but a general connector capable of being coupled to the connector according to the present disclosure may be applied as the counterpart connector.

Both the upper connector 200 and the lower connector 300 to which the present disclosure is applied are described as a hermaphroditic connector in which the pins of the pin array assembly may selectively perform the function of a receptacle or a plug. However, this is one embodiment and is not limited thereto, and any one of the upper connector 200 and the lower connector 300 to which the present disclosure is applied may become a receptacle connector in which the pins of the pin array assembly are configured as receptacle pins while the other may become a plug connector in which the pins of the pin array assembly are configured as plug pins.

The upper connector 200 and the lower connector 300 may be coupled such that pins of the arranged pin array assemblies are engaged and contacted with each other.

When the upper connector 200 and the lower connector 300 are coupled, a coupling alignment error of the pin array occurs, so alignment between the pin arrays is essential.

In the present disclosure, since the upper connector 200 and the lower connector 300 support rigid alignment, it is possible to solve the coupling alignment error between the pin arrays. The performance of the rigid alignment function of the connector according to the present disclosure will be described.

Moreover, an initial alignment of coupling may be guided by a coupling guide means to support proper coupling of the upper connector 200 and the lower connector 300.

At the beginning of the coupling of the upper connector 200 and the lower connector 300, the coupling may be performed as the coupling guide protrusions 216 provided on the upper side of the top mold of the upper connector 200 are guided to the coupling guide grooves 317 provided on the lower side of the top mold of the lower connector 300.

In addition, the coupling may be performed as the coupling guide protrusions 316 provided on the upper side of the top mold of the lower connector 300 are guided to the coupling guide grooves (not shown) provided on the bottom side of the top mold of the upper connector 300.

As such, the upper connector 200 and the lower connector 300 may be initially aligned in the vertical direction by the coupling guide means provided on the upper and lower sides of the upper connector 200 and the lower connector 300.

In addition, the coupling of the upper connector 200 and the lower connector 300 may be performed as coupling guide protrusions 218 provided on the left and right sides of the top mold of the upper connector 200 are guided to correspond to coupling guide regions 319 provided on the left and right sides of the top mold of the lower connector 300.

Moreover, the coupling of the upper connector 200 and the lower connector 300 may be performed as coupling guide protrusions 318 provided on the left and right sides of the top mold of the lower connector 300 are guided to correspond to coupling guide regions 219 provided on the left and right sides of the top mold of the upper connector 200.

As such, the upper connector 200 and the lower connector 300 may be initially aligned in the horizontal direction by the coupling guide means provided on the left and right sides of the upper connector 200 and the lower connector 300.

Figure 17:
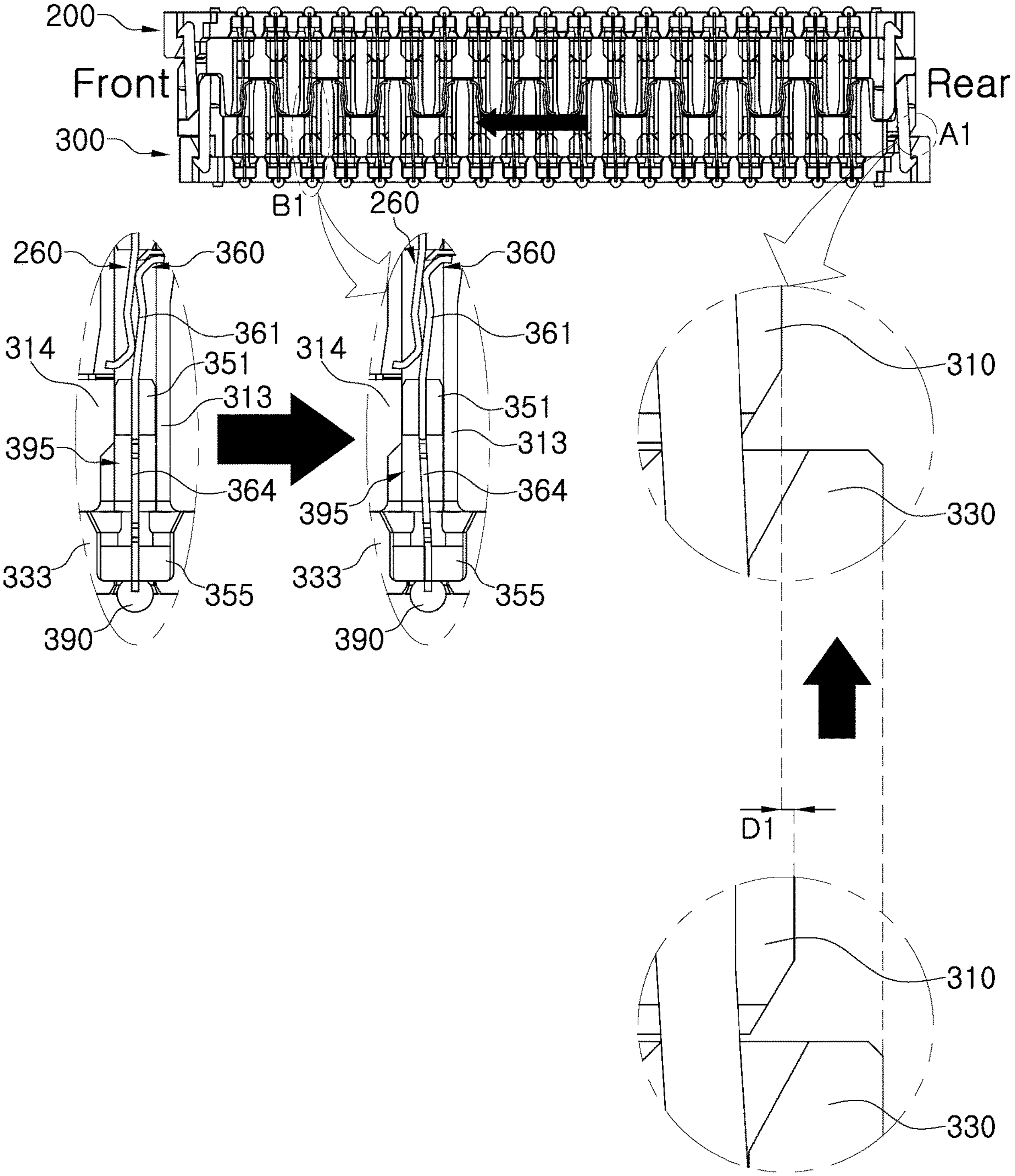
FIGS. 17, 18, 19A and 19B are views showing an example in which rigid alignment is performed in the connector for high-speed signal transmission with a rigid alignment function according to the present disclosure.
Figure 18:
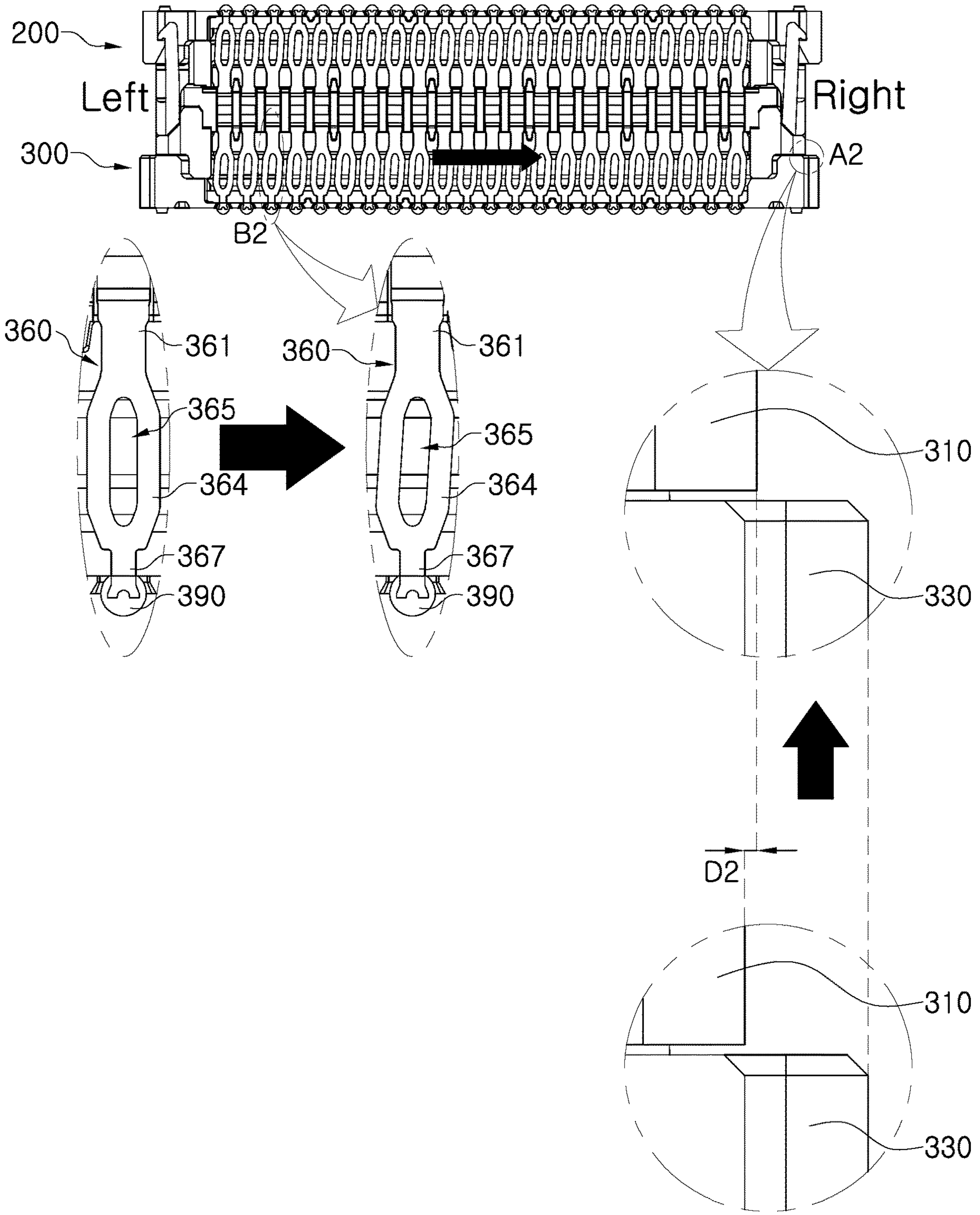

FIGS. 17 to 18 are views showing an example in which rigid alignment is performed in the connector for high-speed signal transmission with a rigid alignment function according to the present disclosure.

As the upper connector 200 and the lower connector 300 according to the present disclosure are coupled, rigid alignment may be performed between the corresponding pin arrays while the top mold is moved slightly in the left-right and front-back directions with respect to the base mold according to the degree of engagement between corresponding pins.

FIG. 17 shows a case in which the upper connector 200 and the lower connector 300 according to the present disclosure are coupled and rigid alignment is performed in the front-rear direction.

As shown in FIG. 17, in the lower connector 300 coupled to the upper connector 200, the top mold 310 of the lower connector 300 may be slightly moved in the front with respect to the base mold 330 so that the pins 260 of the upper connector 200 and the pins 360 of the lower connector 300 are precisely aligned while the corresponding pins are engaged with each other.

In other words, as shown in the enlarged view of A1 of FIG. 17, the top mold 310 is moved forward by D1 with respect to the base mold 330 in order to calibrate the coupling alignment error so that the pin 360 of the lower connector 300 may be precisely engaged with the pin 260 of the upper connector 200.

As the top mold 310 is moved forward by D1 with respect to the base mold 330, the pins 360 of the pin array assembly are also bent by D1. To be specific, as the top mold 310 moves forward, the head area 361 of the pin 360 is pushed by the pin 260 the upper connector 200 to be bent and deformed rearward, and the body area 364 of the pin 360 is bent and deformed forward.

In other words, as shown in the enlarged view of B1 of FIG. 17, since the lower support 355 supporting the lower end of the pin 360 is inserted and fixed between the mounting partition walls 333 of the base mold 330 and the upper support 351 supporting the middle portion of the pin 360 is inserted and fixed between the main partition wall 313 and the sub partition wall 314 of the top mold 310, the upper support 351 moves forward with respect to the lower support 355 as the top mold 310 moves forward with respect to the base mold 330. Accordingly, the body area 364 of the pin

360 located in the cavity 395 space between the upper support 351 and the lower support 355 may be bent and defamed according to the forward movement of the top mold 310 with respect to the base mold 330.

In addition, similar to the operating principle of the lower connector 300, in the case of the upper connector 200, the top mold may move slightly forward or rearward with respect to the base mold of the upper connector 200 for rigid alignment. Since this is a matter that can be understood based on the above-described content, a detailed description thereof will be omitted.

FIG. 18 shows a case in which the upper connector 200 and the lower connector 300 according to the present disclosure are coupled and rigid alignment is performed in the left-right direction.

As shown in FIG. 18, in the lower connector 300 coupled to the upper connector 200, the top mold 310 of the lower connector 300 may be slightly moved to the right with respect to the base mold 330 so that the pins 260 of the upper connector 200 and the pins 360 of the lower connector 300 are precisely aligned while the corresponding pins are engaged with each other.

In other words, as shown in the enlarged view of A2 of FIG. 18, the top mold 310 is moved to the right by D2 with respect to the base mold 330 in order to calibrate the coupling alignment error so that the pin 360 of the lower connector 300 may be precisely engaged with the pin 260 of the upper connector 200.

As the top mold 310 is moved to the right by D2 with respect to the base mold 330, the pins 360 of the pin array assembly are also bent that much. To be specific, as the top mold 310 moves to the right, the body area 364 of the pin 360 is bent and deformed to the left.

In other words, as shown in the enlarged view of B2 of FIG. 18, the lower end of the pin 360 is fixed to the lower support 355 and the middle portion of the pin 360 is fixed by the upper support 351, and as top mold 310 is moved to the right by D2 with respect to the base mold 330, the upper support 351 is moved to the right by that much with respect to the lower support 355. As the upper support 351 is moved to the right with respect to the lower support 355, the body area 364 of the pin 360 is bent and deformed to the right.

In particular, the through hole 365 is formed in the body area 364 of the pin 360 in the present disclosure, and since the body area 364 is located in the cavity 395 space in a state where the width of the body area 364 is adjusted to allow bending and defamation of the body area 364, the body area 364 of the pin 360 may be bendable when rigid alignment is performed.

Moreover, similar to the operating principle of the lower connector 300, in the case of the upper connector 200, the top mold may move slightly to the left or right with respect to the base mold of the upper connector 200 for rigid alignment. Since this is a matter that can be understood based on the above-described content, a detailed description thereof will be omitted.

As such, the connector according to the present disclosure may perform rigid alignment by relatively moving the top mold left and right or front and back with respect to the base mold according to the degree of engagement between the corresponding pins when the connector is coupled with the counterpart connector.

Figure 19A:
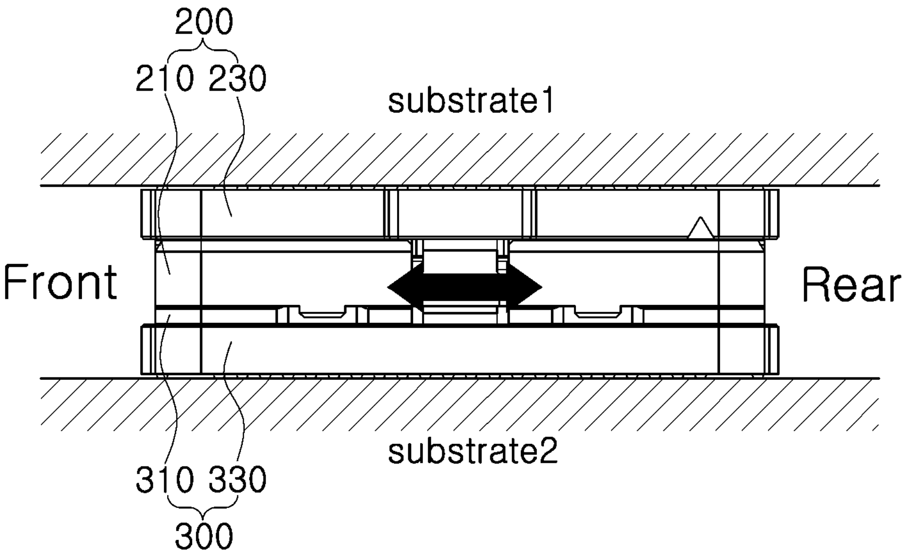
Figure 19B:
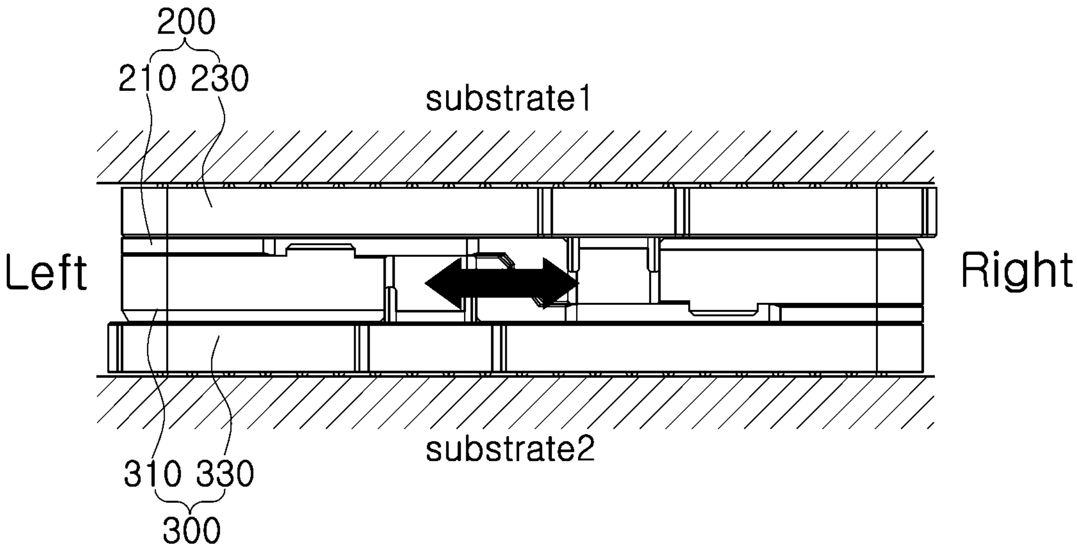

FIGS. 19A and 19B illustrate a concept in which the top molds 210 and 310 are moved by performing rigid alignment when the board-to-board (BTB) connectors 200 and 300 are coupled.

FIG. 19P, shows the concept of rigid alignment being performed forward or rearward.

In the case of coupling the upper connector 200 mounted on the board 1 to the lower connector 300 mounted on the board 2, when viewed with reference to the board 1, the base mold 230 of the upper connector 200 is fixed to the board 1, and the top mold 210 may be moved forward or rearward with respect to the base mold 230.

Since the top mold 310 of the lower connector 300 is engaged with the top mold 210 of the upper connector 200, when the top mold 210 of the upper connector 200 is moved forward or rearward, the top mold 310 of the lower connector 300 engaged therewith may also be moved forward or rearward.

When viewed with reference to the board 2, the base mold 330 of the lower connector 300 is fixed on board 2 so that the top mold 310 is moved forward or rearward with respect to the base mold 330, and accordingly, the top mold 210 of the upper connector 200 may be moved forward or rear.

This can be a relative movement concept depending on what configuration you are setting up as a basis.

That is, when board 1 and board 2 are to be connected through the upper connector 200 and the lower connector 300, there may inevitably be a fine error in the physical configuration, and thus, by relatively moving the top mold 210 of the upper connector 200 and the top mold 310 of the lower connector 300, which are located in the middle, it is possible to calibrate the fine error.

As an example, when applying the embodiments of FIGS. 11 to 13 described above, by forming a spatial length of the rigid insertion part to a length that is 0.5 mm longer than the width of the rigid fastening part, the top mold 210 may be moved forward or rearward up to the range of 0.5 mm with respect to the base mold 230 of the upper connector 200, and if the top mold 310 is able to move forward or rearward up to the range of 0.5 mm with respect to the base mold 330 of the lower connector 300, a front and rear error of up to 1 mm may be aligned when the upper connector 200 and the lower connector 300 are combined.

FIG. 19B shows the concept of rigid alignment being performed to the left or right.

Similar to the previous description with reference to FIG. 19*a* above, when the upper connector 200 and the lower connector 300 are coupled, the top mold 210 may move to the left or right to perform rigid alignment with respect to the base mold 230 of the upper connector 200, while the top mold 310 may move to the left or right to perform rigid alignment with respect to the base mold 330 of the lower connector 300.

As an example, when applying the embodiments of FIGS. 11 to 13 described above, by forming a spatial length of the rigid insertion part to a length that is 0.5 mm longer than the width of the rigid fastening part, the top mold 210 may be moved to left or right up to the range of 0.5 mm with respect to the base mold 230 of the upper connector 200, and if the top mold 310 is able to move left or right up to the range of 0.5 mm with respect to the base mold 330 of the lower connector 300, a left and right error of up to 1 mm may be aligned when the upper connector 200 and the lower connector 300 are combined.

According to the present disclosure, it is possible to provide a high-speed signal transmission connector that may effectively align pin arrays when board-to-board connectors (BTB connectors) are coupled.

In particular, accurate alignment of the pin arrays may be achieved while minimizing the physical stress on the connector pins as alignment is made between the pin arrays as a part of the connector moves slightly left and right or front and rear depending on the degree of engagement between corresponding pins when coupled to a counterpart connector.

Moreover, reliable high-speed signal transmission characteristics may be realized by eliminating a fine error that inevitably occur when coupling connectors by means of rigid alignment.

The above description is merely illustrative of the technical idea of the present disclosure, and various modifications and variations may be made by those skilled in the art to which the present disclosure pertains without departing from the essential characteristics of the present disclosure. Therefore, the embodiments described in the present disclosure are not intended to limit the technical spirit of the present disclosure, but to explain, and the technical spirit of the present disclosure is not limited by these embodiments. The protection scope of the present disclosure should be construed by the following claims, and all technical ideas within the scope equivalent thereto should be construed as being included in the scope of the present disclosure.

What is claimed is:

1. A connector, comprising:

a pin array assembly with connector pins arranged;

a base mold on which a lower end of the pin array assembly is mounted and supported;

a top mold in which a middle portion of the pin array assembly is inserted and supported; and a fastening means configured to couple the base mold to the top mold, and to support rigid alignment by relatively moving the top mold with respect to the base mold according to a degree of engagement between corresponding pins when the connector is coupled to a counterpart connector, wherein the fastening means comprises:

a rigid fastening part formed to protrude in a vertical direction from a side of one of the base mold and the top mold; and a rigid insertion part formed wider than a cross-sectional length of the rigid fastening part on a side of a remaining one of the base mold and the top mold for the rigid fastening part to be inserted and fastened.

2. The connector of claim 1, wherein the base mold and the top mold are coupled by a fastening of the rigid fastening part and the rigid insertion part, and the rigid fastening part is moved in a cross-sectional length direction in the rigid insertion part according to the degree of engagement between corresponding pins when the connector is coupled to the counterpart connector to support rigid alignment.

3. The connector of claim 2, wherein the rigid fastening part comprises:

a fastening support leg formed to protrude vertically downward from a side of the top mold; and a fastening protrusion formed to protrude to an outside of the fastening support leg, and wherein the rigid insertion part comprises:

a fastening hole formed on a side of the base mold to correspond to the rigid fastening part and formed to be wider than a cross-sectional length of the fastening support leg; and a locking jaw formed in the fastening hole so that the fastening protrusion engages therewith.

4. The connector of claim 2, wherein the rigid fastening part is provided on a left side and a right side of the top mold, wherein the rigid insertion part is provided on a left side and a right side of the base mold to correspond to the rigid fastening part, and wherein the top mold is moved to left or right relative to the base mold according to the degree of engagement between corresponding pins when the connector is coupled to the counterpart connector to support rigid alignment.

5. The connector of claim 2, wherein the rigid fastening part is provided on an upper side and a lower side of the top mold, wherein the rigid insertion part is provided on an upper side and a lower side of the base mold to correspond to the rigid fastening part, and wherein the top mold is moved upward or downward relative to the base mold according to the degree of engagement between corresponding pins when the connector is coupled to the counterpart connector to support rigid alignment.

6. The connector of claim 1, further comprising:

a coupling guide protrusion provided on one of an upper side or a lower side of the top mold to guide an initial alignment of coupling with the counterpart connector; and a coupling guide means having a coupling guide groove provided on a remaining one of the upper side or the lower side of the top mold to guide the initial alignment of coupling in correspondence with a coupling guide protrusion of the counterpart connector.

7. The connector of claim 1, further comprising:

a coupling guide protrusion provided on one or more of a left side or a right side of the top mold to guide an initial alignment of coupling with the counterpart connector; and a coupling guide means having a coupling guide region provided on one or more of the left side or the right side of the top mold to guide the initial alignment of coupling in correspondence with a coupling guide protrusion of the counterpart connector.

8. The connector of claim 1, wherein the pin array assembly comprises:

a pin array in which a plurality of pins are arranged horizontally apart;

a lower support in which a lower end of the pin array is inserted and supported, and configured to be coupled to the base mold; and an upper support in which a middle portion of the pin array is inserted and supported, configured to be coupled to the top mold, wherein the upper support is moved with respect to the lower support according to the degree of engagement between corresponding pins when the connector is coupled to the counterpart connector to support rigid alignment.

9. The connector of claim 8, wherein each of the plurality of pins comprises:

a head area having a curved portion that is bent to protrude in one direction to match a pin of the counterpart connector, and whose end is bent to another direction;

a tail area whose end is mounted on the base mold; and a body area that connects the head area and the tail area and has a through hole formed in a center thereof so as to be deformable in a width direction, and wherein the body area is deformed according to the degree of engagement between corresponding pins when coupled to the counterpart connector to support rigid alignment.

10. The connector of claim 9, further comprising:

a cavity formed as a space in which the body area is positioned between the lower support coupled to the base mold and the upper support coupled to the top mold so as to support deformation of the body area when coupled to the counterpart connector.

11. The connector of claim 1, wherein the connector is a hermaphroditic connector in which a plurality of pins of the pin array assembly are a plurality of receptacles, respectively, or a plurality of plugs, respectively.

12. The connector of claim 1, wherein the connector is a receptacle connector in which a plurality of pins of the pin array assembly are a plurality of receptacles, respectively.

13. The connector of claim 1, wherein the connector is a plug connector in which a plurality of pins of the pin array assembly are a plurality of plugs, respectively.

14. The connector of claim 3, wherein the rigid fastening part is laterally movable within the fastening hole by a predetermined range to allow the top mold to shift relative to the base mold and enable rigid alignment.

15. The connector of claim 14, wherein each of the connector pins comprises a body area having a through-hole and positioned in a cavity between the base mold and the top mold to allow deformation in a width direction during alignment with the counterpart connector.

* * * * *